United States Patent [19]

Brown et al.

[11] Patent Number: 5,072,452

[45] Date of Patent: Dec. 10, 1991

[54] AUTOMATIC DETERMINATION OF LABELS AND MARKOV WORD MODELS IN A SPEECH RECOGNITION SYSTEM

[75] Inventors: Peter F. Brown, New York; Peter V. De Souza, Yorktown Heights; David Nahomoo; Michael A. Picheny, both of White Plains, all of N.Y.

[73] Assignee: International Business Machines Corporation, Armonk, N.Y.

[21] Appl. No.: 431,720

[22] Filed: Nov. 2, 1989

Related U.S. Application Data

[63] Continuation of Ser. No. 115,505, Oct. 30, 1987, abandoned.

[51] Int. Cl.$^5$ .................................................. G10L 5/06
[52] U.S. Cl. ........................................................ 381/43
[58] Field of Search ................................. 381/41–46; 364/513, 513.5; 382/14–15

[56] References Cited

U.S. PATENT DOCUMENTS

| | | | |
|---|---|---|---|
| Re. 26,772 | 1/1970 | Lazarus | 340/172.5 |
| 3,333,248 | 7/1967 | Greenberg et al. | 340/172.5 |
| 3,440,617 | 4/1969 | Lesti | 340/172.5 |
| 3,623,015 | 6/1971 | Schmitz et al. | 340/172.5 |
| 3,950,733 | 4/1976 | Cooper et al. | 340/172.5 |
| 4,177,448 | 12/1979 | Brayton | 340/146.3 |
| 4,181,821 | 1/1980 | Pirz et al. | 179/1 |
| 4,309,756 | 1/1982 | Beckler | 364/300 |
| 4,327,354 | 4/1982 | Persoon | 340/146.3 |
| 4,336,421 | 6/1982 | Welch et al. | 179/1 |
| 4,412,098 | 10/1983 | An | 381/43 |
| 4,451,929 | 5/1984 | Yoshida | 382/15 |
| 4,618,984 | 10/1986 | Das et al. | 381/43 |
| 4,741,036 | 4/1988 | Bahl et al. | 381/43 |
| 4,748,670 | 5/1988 | Bahl et al. | 381/43 |
| 4,751,737 | 6/1988 | Gerson et al. | 381/43 |
| 4,759,068 | 7/1988 | Bahl et al. | 381/43 |
| 4,783,804 | 11/1988 | Juang et al. | 381/43 |
| 4,827,521 | 5/1989 | Bahl et al. | 381/43 |

FOREIGN PATENT DOCUMENTS 0238691 9/1987 European Pat. Off. .
0238697 9/1987 European Pat. Off. .
0243009 10/1987 European Pat. Off. .

OTHER PUBLICATIONS

Nadas, A., et al., "Continuous Speech Recognition with Automatically Selected Acoustic Prototypes Obtained by Either Bootstrapping or Clustering," IEEE CH1610-5/81, pp. 1153–1155.

Primary Examiner—Gary V. Harkcom
Assistant Examiner—John Merecki
Attorney, Agent, or Firm—Marc D. Schechter

[57] ABSTRACT

In a Markov model speech recognition system, an acoustic processor generates one label after another selected from an alphabet of labels. Each vocabulary word is represented as a baseform constructed of a sequence of Markov models. Each Markov model is stored in a computer memory as (a) a plurality of states; (b) a plurality of arcs, each extending from a state to a state with a respective stored probability; and (c) stored label output probabilities, each indicating the likelihood of a given label being produced at a certain arc. Word likelihood based on acoustic characteristics is determined by matching a string of labels generated by the acoustic processor against the probabilities stored for each word baseform. Improved models of words are obtained by specifying label parameters and constructing word baseforms interdependently and iteratively.

21 Claims, 14 Drawing Sheets

| FIG.14A | FIG.14B |

AUTOMATIC DETERMINATION OF LABELS AND MARKOV WORD MODELS IN A SPEECH RECOGNITION SYSTEM

This is a continuation of application Ser. No. 115,505, filed Oct. 30, 1987, now abandoned.

BACKGROUND OF THE INVENTION

I. Field of the Invention

The present invention relates in general to the recognition of speech probabilistically by representing words as respective sequences of Markov models in which labels—of a defined alphabet of labels—represent Markov model outputs.

II. Description of the Problem

In language processing, it is common for a human phonetician to segment words into sequences of phonetic elements—the phonetic elements being selected from the International Phonetic Alphabet. Typically, the phonetician listens to a word and, based on his/her expertise, matches successive portions of the word with respective phonetic elements to determine a phonetic spelling of the word.

Such phonetic sequences have been provided in standard dictionaries. Also, however, phonetic sequences have been applied to speech recognition in general and to Markov model speech recognition in particular.

In the case of Markov model speech recognition, the various phonetic elements are represented by respective Markov models. Each word then corresponds to a sequence of phonetic Markov models.

FIG. 1 is a diagram depicting a sample Markov model which can represent a phonetic element. It is observed that the sample phonetic element Markov model includes seven states S1 through S7 and thirteen arcs (or transitions) which extend from a state to a state. Some arcs are simply loops extending from an arc back to itself while the other arcs extend from one arc to another. During a training session, a known word sequence is uttered and a probability for each arc in each Markov model is determined and stored.

Some arcs—referred to as "null arcs"—are depicted with dashed lines. Non-null arcs are shown with solid lines. For each non-null arc, there are a plurality of label output probabilities associated therewith. A label output probability is the probability of a given label being produced at a given non-null arc in a given Markov model. These probabilities are also determined during the training session.

In the recognition process, the Markov models are employed in conjunction with an acoustic processor. The acoustic processor, in brief, receives a speech input and processes successive intervals of speech based on pre-defined parameters. Sample parameters have, in the past, included energy amplitudes at various frequency bands. Treating each parameter characteristic (e.g. the amplitude at each frequency) as a vector component, the collection of amplitudes represents a vector in speech space. The acoustic processor stores a plurality of predefined prototype vectors having prescribed vector component—or parameter—values and assigns a label to each prototype vector. For each of successive intervals, a vector (referred to as a "feature vector") is generated by the acoustic processor 202 in response to an uttered input. Each component of a feature vector corresponds to the amplitude of a respective one of the parameters for a given interval. For each time interval, the label for the prototype vector which is "closest" to the feature vector is selected. For each interval, then, a label is generated by the acoustic processor.

The labels generated by the acoustic processor are the same labels which can be produced as label outputs along the arcs of the Markov models. After arc probabilities and label output probabilities are assigned during the training session, a procedure may be followed to determine the likelihood of a certain Markov model or sequence of Markov models—which corresponds to a "word baseform"—given a particular string of labels generated by the acoustic processor. That is, given that labels $f_1 f_2 f_3 \ldots$ have been generated by the acoustic processor for successive intervals of speech, the likelihood of proceeding through each path of a Markov model (or sequence of models) and producing the string of generated labels can be determined. Performing this calculation for a word in a vocabulary provides a measure of that word's likelihood.

The accuracy of a Markov model speech recognizer is greatly dependent on (a) a proper selection of the parameter values for the labels in the alphabet of labels and (b) a proper selection of the Markov model structure and the statistics applied to the arcs. It has been found that reliance on human phoneticians to define the constituent parts of a word results in an arbitrariness in modelling, a lack of uniformity in the word baseforms (i.e., sequences of constituent parts which form a word), and accuracy levels which are not satisfactory.

In addition, the use of an alphabet of labels with fixed parameter values, which depends on some predefined clustering algorithm, has resulted in less than optimal recognition.

SUMMARY OF THE INVENTION

In accordance with the present invention, the label parameter values and Markov model word baseforms are determined interdependently. That is, the parameter values of the labels in the alphabet are initially specified; Markov model word baseforms are defined; and the parameter values of the labels in the alphabet are re-specified based on data used in defining the word baseforms.

Rather than fixing the label parameter values, the present invention makes the label specification and word baseform definitions interdependent.

The present invention employs Markov models which, instead of corresponding to phonetic elements, correspond to the labels. For each label there is a label-related, or "fenemic", Markov model. Each such model has a plurality of arcs—with at least some non-null arcs at which labels may be produced. Due to speech variations, a jth Markov model in the set of models—which corresponds to the jth label in the label alphabet—typically includes arcs at which labels other than the jth label may have a non-zero probability of being produced. Each word is represented as a sequence of fenemic Markov models.

When the word corresponding to a word baseform is uttered, the sequence of fenemic Markov models is aligned against the labels generated by an acoustic processor. For each fenemic Markov model in the sequence, the labels aligned thereagainst are identified. Moreover, the feature vectors which gave rise to the aligned labels are also identified. Using the mean and covariance values of all feature vectors aligned against a given fenemic Markov model, the prototype vector of the label associated with the given fenemic Markov model is re-specified Repeating this for all fenemic Markov models results in a new alphabet of re-specified labels, i.e. labels with re-specified parameter values.

The re-specified label alphabet is then used to up-date the word baseform structures and probabilities.

In iterative fashion, the up-dated word baseform data may be used in again re-specifying the label parameters in the alphabet and the re-specified labels may be used in again updating the word baseform data, and so on for a desired number of iterations.

Making the label parameter values and word baseforms interdependent has resulted in increased speech recognizer performance and accuracy.

DESCRIPTION OF THE INVENTION

A. Specifying Labels and Markov Model Word Baseforms Interdependently

Figure 2:
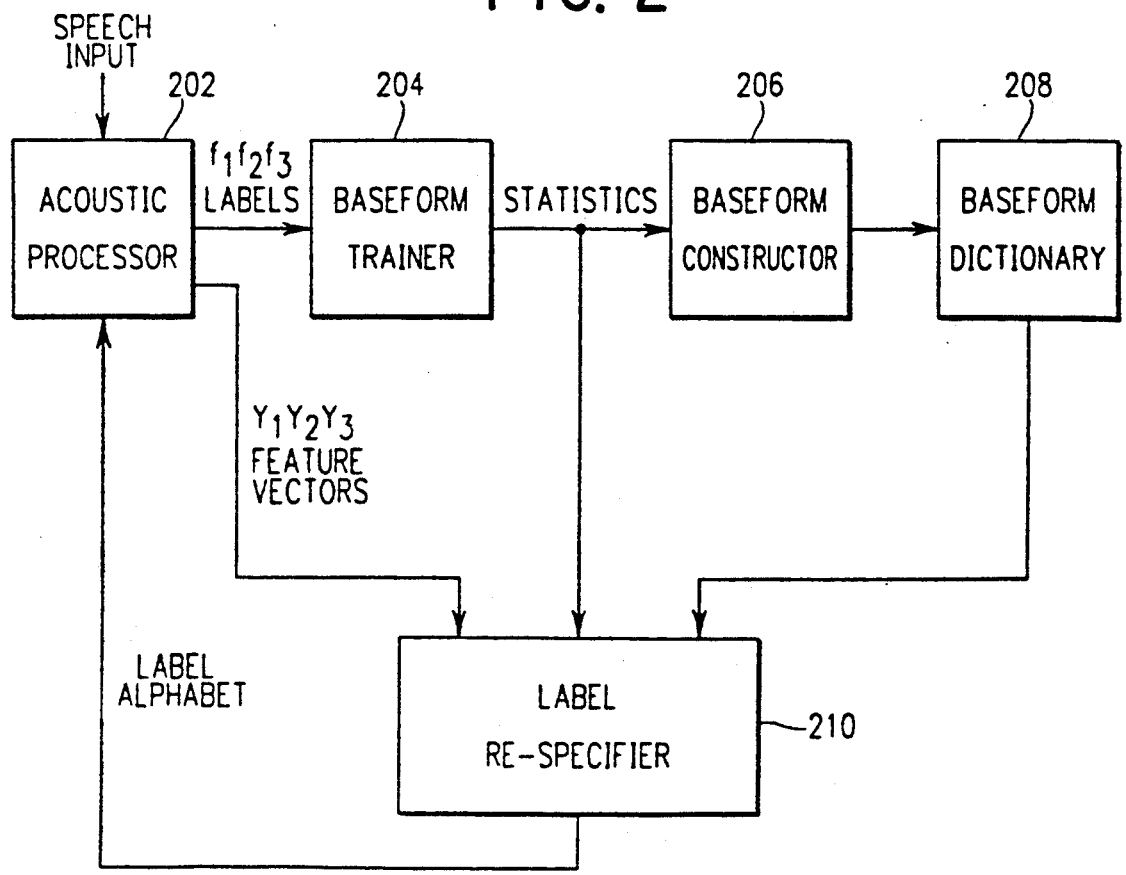
FIG. 2 is a block diagram illustrating apparatus for respecifying labels and constructing Markov model word baseforms interdependently according to the present invention.

Referring to FIG. 2, speech input is shown entering an acoustic processor 202. The speech input is in the form of an acoustic waveform. Stored in the acoustic processor 202 are parameters of an alphabet of two hundred labels L1, L2, L3, ..., L200. The label parameter values are stored in memory as indicated in TABLE 1 under the heading "Labels".

TABLE 1

| MEMORY LAYOUT OF INVENTION | | | | |
|---|---|---|---|---|
| Feature Vectors | | | | |
| Location | 1 | 2 | ... | N |
| Value | $y_1^{11}(1)$ | $y_1^{11}(2)$ | ... | $y_1^{11}(N)$ |
| Location | $N+1$ | $N+2$ | ... | $2N$ |
| Value | $y_2^{11}(1)$ | $y_2^{11}(2)$ | ... | $y_2^{11}(N)$ |
| | . | | | |
| | . . | | | |
| Location | $l^{11}N+1$ | $l^{11}N+2$ | ... | $(l^{11}+1)N$ |
| Value | $y_1^{12}(1)$ | $y_1^{12}(2)$ | ... | $y_1^{12}(N)$ |
| Labels | | | | |
| Location | 1 | 2 | ... | $l^{11}$ |
| Value | $f_1^{11}$ | $f_2^{11}$ | ... | $f_{l11}^{11}$ |
| Location | $l^{11}+1$ | $l^{11}+2$ | ... | $l^{11}+l^{12}$ |
| Value | $f_1^{12}$ | $f_2^{12}$ | ... | $f_{l12}^{12}$ |
| | . | | | |
| | . | | | |
| Viterbi Alignments | | | | |
| Location | 1 | 2 | ... | $l^{11}$ |
| Value | $v_1^{11}$ | $v_2^{11}$ | ... | $v_{l11}^{11}$ |
| Location | $l^{11}+1$ | $l^{11}+2$ | ... | $l^{11}+l^{12}$ |
| Value | $v_1^{12}$ | $v_2^{12}$ | ... | $v_{l12}^{12}$ |
| | . | | | |
| | . | | | |
| Baseforms | | | | |
| Location 1 2 3 4 5 6 7 ... $3+2*NT_{11}-1$ $3+2*NT_{11}$ | | | | |
| Value  NNodes$_1$ NID$_{11}$ NT$_{11}$ T$_{111}$ S$_{111}$ T$_{112}$ S$_{112}$ ... T$_{11NT11}$ S$_{11NT11}$ | | | | |

TABLE 1-continued
MEMORY LAYOUT OF INVENTION

| Location | $3+2*NT_{11}+1$ | $3+2*NT_{11}+2$ | $3+2*NT_{11}+3$ | ... | $5+2*(NT_{11}+NT_{12})-1$ |
|---|---|---|---|---|---|
|  | $NID_{12}$ | $NT_{12}$ | $T_{121}$ |  | $T_{11NT12}$ |
| Location | $5+2*(NT_{11}+NT_{12})$ |  |  | ... | $S_{11NT12}$ |

Statistics

| | | | | | |
|---|---|---|---|---|---|
| Location | 1 | 2 | 3 | ... | NLABELS |
| Value | $P_{11}$ | $P_{12}$ |  | ... | $P_{1NLABELS}$ |
| Location | NLABELS + 1 | NLABELS + 2 |  | ... | 2NLABELS |
| Value | $P_{21}$ | $P_{22}$ |  | ... | $P_{2NLABELS}$ |
| Location | (NARCS−1) NLABELS+1 |  |  | ... | NARCS * NLABELS |
| Value | $P_{NARCS1}$ |  |  | ... | $P_{NARCS1NLABELS}$ |

Means

| | | | | | |
|---|---|---|---|---|---|
| Location | 1 | 2 | 3 | ... | N |
| Value | $M_1(1)$ | $M_1(2)$ | $M_1(3)$ | ... | $M_1(N)$ |
| Location | N + 1 | N + 2 |  | ... | 2N |
| Value | $M_2(1)$ | $M_2(2)$ |  | ... | $M_2(N)$ |
| Location | $N(NP−1)+1$ | $N(NP−1)+2$ |  | ... | $N*NP$ |
| Value | $M_{NP}(1)$ | $M_{NP}(2)$ |  | ... | $M_{NP}(N)$ |

Variances

| | | | | | | | | |
|---|---|---|---|---|---|---|---|---|
| Location | 1 | 2 | 3 | ... | N | N+1 | N+2 | ... | $N*(N+1)/2$ |
| Value | $C_1(1,1)$ | $C_1(1,2)$ | $C_1(1,3)$ | ... | $C_1(1,N)$ | $C_1(2,2)$ | $C_1(2,3)$ | ... | $C_1(N,N)$ |
| Location | $N(N+1)/2+1$ |  |  | ... |  | $2*N(N+1)/2$ | | | |
| Value | $C_2(1,1)$ |  |  | ... |  | $C_2(N,N)$ | | | |
| Location | $(NP−1)(N*(N+1)/2)+1$ |  |  |  |  | $NP(N*(N+1)/2)$ | | | |
| Value | $C_{NP}(1,1)$ |  |  | ... |  | $C_{NP}(N,N)$ | | | |

Locations 1 through $1^{11}$ contain label parameter values $f_1{}^{11}$ through $f_{l11}{}^{11}$ respectively, where $1^{in}$ represents the number of labels in the nth utterance of the ith word.

Viewing speech as a coordinate space, each label identifies a distinct cluster in the space. That is, each cluster of vectors in speech space is represented by a respective prototype vector and each prototype vector is identified with a respective label. For a speech input, the acoustic processor 202 puts out a string of labels where each successive label corresponds to a time interval of speech. Briefly, the acoustic processor 202 converts the speech input into successive feature vectors generated at successive time intervals and assigns a label to each successive feature vector.

For each given interval, a feature vector is determined based on parameter values and a determination is made as to which cluster the feature vector belongs. The label identifying the determined cluster is provided as output for the given interval.

A preferred form of the acoustic processor 202 is described in "Nonlinear Signal Processing in Speech Recognition" by R. Bakis et al., Ser. No. 665,401 filed Oct. 26, 1984, now abandoned. In that preferred form, the parameters representing components of each feature vector are "neural firing rates", each neural firing rate corresponding to a distinct frequency band. The neural firing rate for each band is determined based on a model of the human ear and a neural firing rate equation (for each frequency band) derived from the human ear model. Each neural firing rate (for a respective frequency band) is one component of each feature vector. By any of various known clustering techniques, the coordinate space which contains all of the possible feature vectors having neural firing rate components are partitioned into unique clusters. The clusters (each having a respective prototype vector) are identified respectively by labels L1, L2, L3, ..., L200. For each successive interval of time (e.g., a centisecond), preferably twenty neural firing rates are determined; the feature vector having the determined firing rates as components is then compared to each of the two hundred clusters (or prototype vectors) to determine which is "closest" by some prescribed measure; and the label for said closest prototype vector is designated as the acoustic processor output for the given interval of speech.

In preparing the acoustic waveform for the process of assigning labels to successive speech intervals, the speech analog waveform is digitized, time intervals are generated, and the digital signal is passed through a Fast Fourier Transform, as described in the aforementioned co-pending patent application.

The outputs of the acoustic processor 202 include labels $f_1 f_2 f_3 \ldots$ and feature vectors $y_1 y_2 y_3 \ldots$ That is, for each interval of speech, there is a corresponding feature vector and a corresponding label.

The labels $f_1 f_2 \ldots$ enter a baseform trainer 204. The baseform trainer 204 is used in determining the probabilities which are to be applied to the Markov models in each word baseform, where each "word baseform" represents a prescribed sequence of Markov models. For each Markov model, storage in memory is provided (see TABLE 1) for containing arc probabilities and label probabilities. The probabilities are computed during a training session in which a known text is uttered.

For the known text, there is a corresponding known sequence of Markov models. When the known text is uttered by a speaker into an acoustic processor (e.g., processor 202), a string of labels is generated. By employing the well-known Forward-Backward algorithm described in greater detail below, probabilities for the arcs and for the labels produced at the non-null arcs of each Markov model are computed by the baseform trainer 204. The probability statistics computed by the baseform trainer 204 enter a baseform constructor 206. The baseform constructor 206 determines the sequence of Markov models for each word. The sequence of Markov models for each word and the arc probabilities and label output probabilities for each non-null arc in a Markov model are contained in a baseform dictionary 208. The storage structure of the baseform dictionary 208 is shown in TABLE 1 under the headings "Baseforms" and "Statistics".

In particular, the baseform dictionary 208 stores the following types of data items:

$NNODES_i$ = the number of nodes in the ith word baseform.

$NID_{ij}$ = the node identifier of the jth node in the ith word baseform.

$NT_{ij}$ = the number of arcs (transitions) from node $NID_{ij}$.

$T_{ijk}$ = the node identifier at which the kth arc from node $NID_{ij}$ terminates.

$S_{ijk}$ = statistics pointer for arc (transition) $T_{ijk}$; points to 0 for a null arc and to a row in TABLE 1 for a non-null arc.

The significance of the data items stored in the "Baseform" and "Statistics" portions of TABLE 1 will be discussed in greater detail hereinbelow.

During training, baseform data (i.e., Markov model sequences and probability statistics therefor) and the feature vectors corresponding to successive speech intervals enter a label re-specifier 210. The label re-specifier 210 redefines the prototype vectors and clusters associated with the labels based on data generated during word baseform construction.

Figure 3:
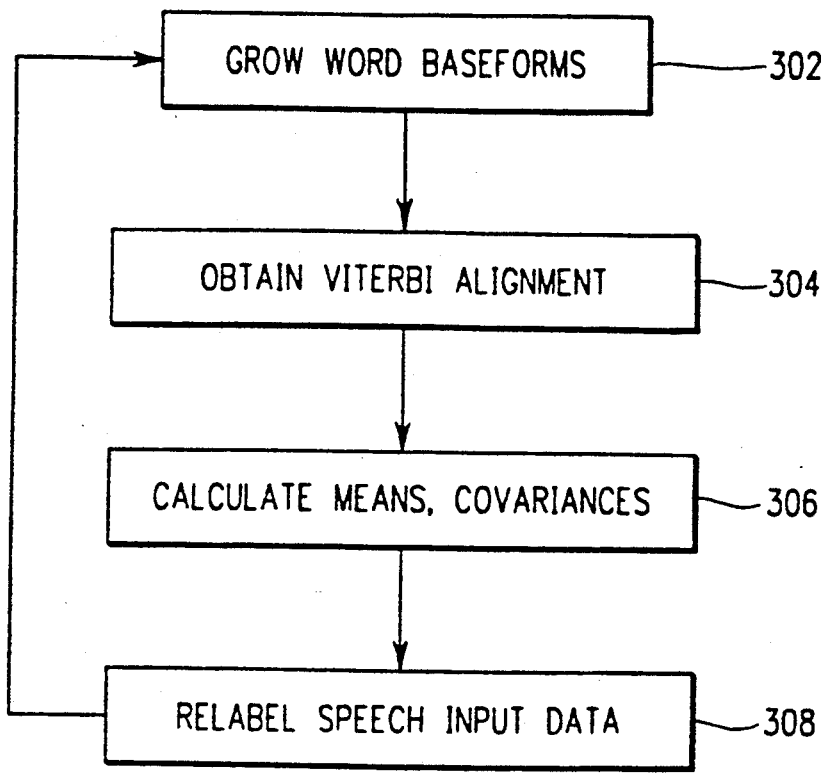
FIG. 3 is a flow diagram illustrating the general steps performed in re-specifying labels and constructing Markov model word baseforms interdependently according to &he present invention.

The operation of the apparatus of FIG. 2 is reflected in FIG. 3. FIG. 3 shows four major steps of the invention. In step 302, word baseforms are "grown" or, more specifically, the sequence of Markov models and the statistics for the models are stored in computer memory (as described in greater detail hereinbelow). During the training session, words are uttered in a known order and labels are generated in response to the utterance. In a matching procedure step 304 (referred to as Viterbi alignment), successive substrings of labels generated in response to uttering the training text are associated with each Markov model in a word baseform. Accordingly, for the first Markov model in the first word uttered in the training text, there is an aligned substring of labels; for the second Markov model in the first word uttered in the training text, there is aligned a second substring of labels; ... ; for the last Markov model in the first word, there is aligned a last substring of labels; and so on for the successive words in the training text.

Each label corresponds to a prototype vector and each label is selected by comparing a feature vector input for an interval of speech with each prototype vector—the label of the "closest" prototype vector being assigned to such interval.

Figure 1:
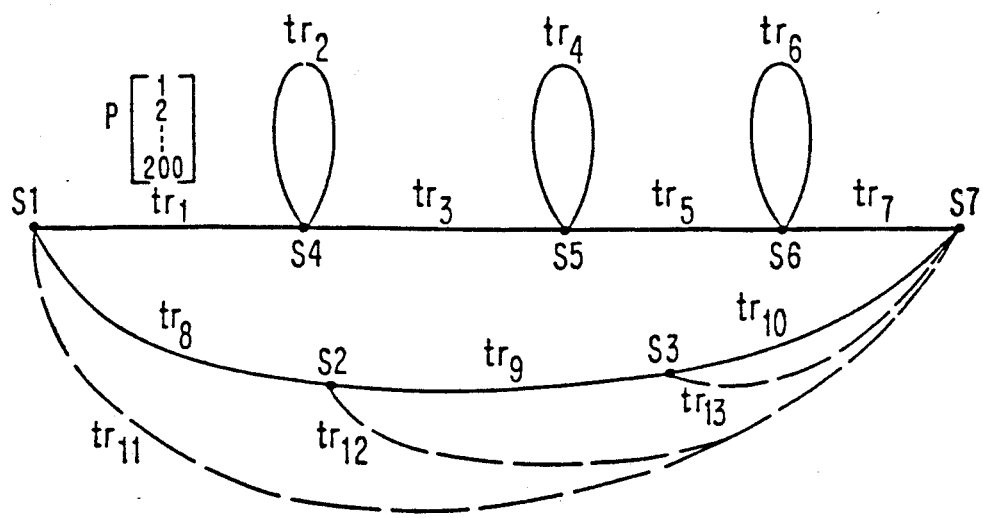
FIG. 1 is a diagram of a sample phonetic element Markov model.
Figure 4:
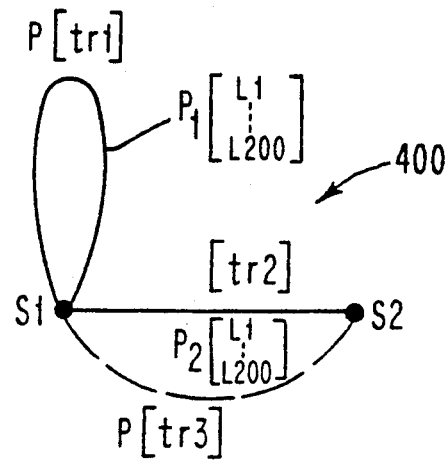
FIG. 4 is a drawing depicting a label-related, or fenemic, Markov model.

In accordance with the invention, each Markov model in the set of models corresponds to a respective label in the label alphabet and preferably has a simpler structure than the phonetic element Markov model structure of FIG. 1. A sample structure 400, referred to as a "fenemic Markov model", is shown in FIG. 4. "Feneme" is an alternative expression for "label". In particular, the fenemic Markov model 400 has two states S1 and S2; a non-null loop arc extending from state S1 back to itself; a non-null arc extending from state S1 to state S2; and a null arc extending from state S1 to state S2. Each of the three arcs has a respective probability of being followed—namely p[tr1], p[tr2], and p[tr3]—which are computed during the training session. At each non-null arc there are label output probabilities for the first arc, namely $$p_1 \begin{bmatrix} L1 \\ L2 \\ \cdot \\ \cdot \\ \cdot \\ L200 \end{bmatrix}$$

and for the second arc, $$p_2 \begin{bmatrix} L1 \\ L2 \\ \cdot \\ \cdot \\ \cdot \\ L200 \end{bmatrix}$$

In defining the Markov models as fenemic Markov models, it is observed that each word baseform is characterized as a sequence of models each of which corresponds to a label and not a phonetic element. That is, instead of the word "THE" being defined as a sequence of three phonetic element Markov models (see FIG. 1)—one for each of the respective phonetic elements DH, UH1, and XX—the word "THE" is defined as a sequence of perhaps sixty fenemic Markov models each structured as in FIG. 4. For example, the word "THE" may be represented by the sequence of fenemic Markov models $F_{30}F_{30}F_{30}F_{32}F_{12}...F_5$ where $F_t$ corresponds to the tth label in the alphabet. When the word "THE" is actually uttered, the labels generated and models corresponding to the utterance may not correlate one-to-one due to variations in speech over time, noise, and variations in speech due to context. Hence, although the word "THE" may, for example, be formed of the fenemic Markov models $F_{30}F_{30}F_{30}F_{32}F_{12}...F_5$, the actual labels generated need not be L30-L30-L30-L32-L12... Zero, one, or more labels may be produced in response to the uttering of a word segment corresponding to a given fenemic Markov model. This fact is reflected by the transition probabilities and label output probabilities stored for each fenemic Markov model during the training session. Oftentimes the probability of the label corresponding to a given fenemic Markov model (e.g., label L20 for fenemic Markov model $F_{20}$) is high and, for an utterance, the fenemic Markov model may produce only the label corresponding thereto. However, the non-zero label probabilities in each Markov model indicate that other labels may be produced also In the above example, the first fenemic Markov model $F_{30}$ may produce simply the label L30 during an utterance or, depending on the utterance, may produce labels L28 followed by L30 followed by L28 or may produce other strings of labels.

The storing of word baseforms in memory is reflected in TABLE 1 under the heading "Baseforms" and "Statistics". Noting that the terms "node" and "state" are interchangeable and that the terms "arc" and "transition" are interchangeable, the entries in memory are now discussed. In location 1 of the "Baseforms" section of memory, the number of nodes in the first baseform—namely $NNODES_1$ is contained. In location 2 is stored an identifier for the first node in the first word baseform, i.e. $NID_{11}$. In location 3 is the value corresponding to the number of arcs extending from node $NID_{11}$. In location 4 is the identifier for the destination node of the first arc extending from node $NID_{11}$. At location 5 is a statistics identifier, $S_{111}$, which points to the data for arc $T_{111}$ Further data of these types are also stored.

In the "Statistics" portion of memory in TABLE 1, probability values are stored for each label being produced at each arc. In the first row, labels $P_{11}$ through $P_{1NLABELS}$ (NLABELS=number of labels in the alphabet) are provided to store the probability value of label L1 being produced at the first arc, label L2 being produced at the first arc, label L3 being produced at the first arc, and so on through the last label in the alphabet which is preferably L200 (where NLABELS=200). The second row pertains to the label probabilities at the second arc. The last row pertains to the label probabilities applied to the last arc (where the number of arcs is symbolized by NARCS).

Referring to FIG. 4, the significance of the stored data items in the "Baseforms" and "Statistics" sections is clarified. For a typical word, sixty to one hundred fenemic Markov models are concatenated. State S2 of one fenemic Markov model is State S1 of a next Fenemic Markov model. If the ith word includes seventy fenemic Markov models, $NNODES_i$ is stored in location 1 of the "Baseforms" section as 71. Each of the seventy-one nodes will have a corresponding ID number stored at location 2; location $(3+2\times NT_{11}+1)$; and the like. For fenemic Markov models as in FIG. 4, the number of arcs extending from each node is the same for each node (i.e., state). There is a self-loop arc and, between the subject node and the next node, there are (a) a null arc and (b) a non-null arc. Hence, $NT_{ij}$ in this embodiment will be three. For the self-loop arc, let k=1. Then $T_{111}$ will contain the value identifying the first node. The other two arcs from the first node both extend to the second node; accordingly, $T_{112}$ and $T_{113}$ will identify the second node as the destination thereof. Moving from node to node in one word baseform to the next, the "Baseforms" section allocates storage for the data items pertaining to baseforms.

In general, then, the pointer $S_{ijk}$ points to the probabilities which apply to a given kth arc in an ith baseform. For the first arc, the first row in the "Statistics" section of memory applies. For the second arc, the second row applies; and so on through all arcs in the baseform.

The structuring of word baseforms of fenemic Markov models is described in two co-pending patent applications "Feneme-Based Markov Models for Words" by Bahl et al., Ser. No. 697,174 filed Feb. 1, 1985 and "Constructing Markov Models of Words from Multiple Utterances" by Bahl et al., Ser. No. 738,933 filed May 29, 1985, which are incorporated herein by reference to the extent required for sufficient disclosure of the present invention.

Still referring to FIG. 3, it is noted that the baseforms in step 302 are preferably sequences of fenemic Markov models and that the Viterbi alignment step 304 involves the associating of each fenemic Markov model with labels.

In step 304, the labels aligned and associated with a given fenemic Markov model are identified. Also identified are the feature vectors from which the labels (corresponding to the given fenemic Markov model) are derived. For each fenemic Markov model, there are zero, one or more feature vectors identified therefor. In step 306, the feature vectors identified for each fenemic Markov model are combined to compute mean values and covariance values. Referring again to the example sequence of fenemic Markov models for the word "THE", namely $F_{30}F_{30}F_{30}F_{32}F_{12}$ . . . suppose that the first occurrence of $F_{30}$ results in the alignment of label L30 therewith; the second occurrence thereof results in the alignment of labels L28, L30, and L28; and the third final occurrence thereof results in the alignment of no labels. In accordance with step 306, a mean is computed for the feature vectors which led to the generating of the label L30 (first occurrence of $F_{30}$); the label 28, the label 30, and the label 28 (second occurrence of $F_{30}$); and no feature vector. Covariances are also computed for the fenemic Markov model $F_{30}$. Similarly, for each fenemic Markov model, means and covariances are computed pursuant to step 306. Mean values and covariance values determined for a subject fenemic Markov model define the prototype vector (i.e. the parameter values) and cluster associated with the label corresponding to the subject fenemic Markov model.

The computed means and covariances for each fenemic Markov model are used in re-labelling incoming speech data pursuant to step 308. In particular, in selecting the label corresponding to a given interval of speech, the feature vector generated therefor is compared to the means and covariances specified for each label (pursuant to step 306). That is, the means and covariances for a fenemic Markov model corresponding to label j are used to determine the distance between an input feature vector and the label j. Stated briefly, each jth label is re-specified based on the means and covariances of the fenemic Markov model corresponding to the jth label.

The new specification of labels is entered into the acoustic processor 202 of FIG. 2. The acoustic processor 202 then labels speech based on the re-specified labels.

The sequence of fenemic Markov models and the respective statistics therefor are then up-dated as new word baseforms are grown in step 302 based on re-specified labels. Steps 302 through 308 may be repeated several times as desired. The dovetailing of label specification and baseform growing has resulted in improved speech recognition accuracy.

Figure 5:
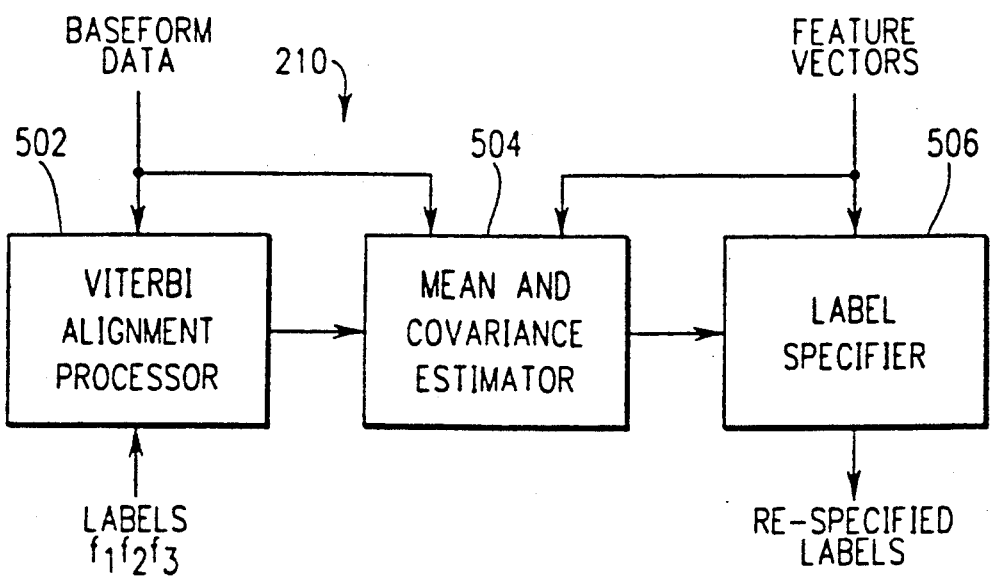
FIG. 5 is a block diagram illustrating a preferred embodiment of a label re-specifier shown in FIG. 2.

Referring now to FIG. 5, a specific diagram of the label re-specifier 210 is shown. The re-specifier 210 includes a Viterbi alignment processor 502 which receives as input (a) the most recent constructed word baseforms, (b) statistics determined during training, and (c) the string of labels generated during the training session. As noted hereinabove, the purpose of the Viterbi alignment processor 502 is to match substrings of labels with Markov models in a word baseform.

Figure 6:
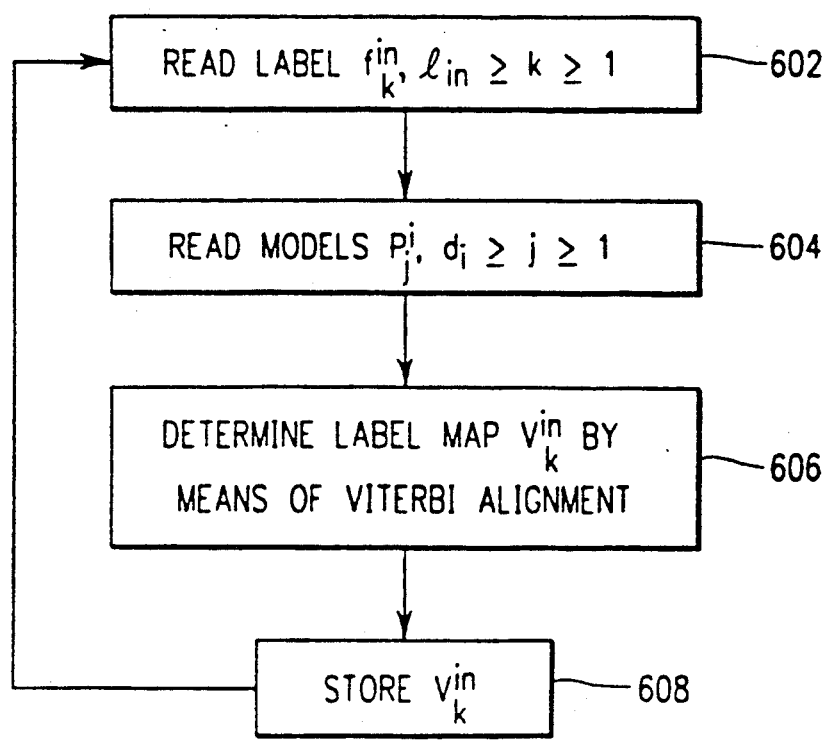
FIG. 6 is a flow diagram showing the steps performed in Viterbi alignment.

The operation of the Viterbi alignment processor 502 is described with reference to FIG. 6. In FIG. 6, the following definitions apply.

$p_j^i$ = the jth fenemic Markov model of the ith word in a text of uttered words.

$d_i$ = the number of fenemic Markov models associated with the ith word in a text of uttered words.

$f_k^{in}$ = the kth label of the nth utterance of the ith word.

$l_{in}$ = the number of labels associated with the nth utterance of the ith word in a text of uttered words.

$v_k^{in}$ = the mapping of the kth label of the nth utterance of the ith word in a text of uttered words where $l_{in} \geq k \geq 1$, $d_i \geq v_k^{in} \geq 1$.

In FIG. 6, it is assumed that at least some vocabulary words are uttered more than once. In step 602, the Viterbi alignment processor 502 reads in $f_k^{in}$ where $l_{in} \geq k \geq 1$. That is, a label in the string of labels generated by the acoustic processor 202 during training is identified. In step 604, the jth fenemic Markov model of one of the known words in the training text is identified. That is, $p_j^i$ (where $d_i \geq j \geq 1$) is read by the Viterbi alignment processor 502. In step 606, the kth label is mapped to a value $v_k^{in}$ which is stored in memory in step 608. For each utterance of each word, each kth label in the utterance has a $v_k^{in}$ value determined and stored therefor.

TABLE 1, under the heading of "Viterbi Alignments", shows the memory—associated with the re-labeller 210—which contains $v_k^{in}$ values. $v_k^{in}$ values for labels corresponding to the first utterance of a first word are located in memory locations 1 through $1^{11}$ in the first row. Locations $1^{11}+1$ through $1^{11}+1^{12}$ in the second row contain $v_k^{in}$ values for the second utterance of the first word. In the bottom row (not shown), the $v_k^{in}$ values for the labels corresponding to the last utterance of the last word are stored. It is observed that successive entries in a row correspond to successive labels generated in response to the uttering of the jth utterance of the ith word.

Figure 7:
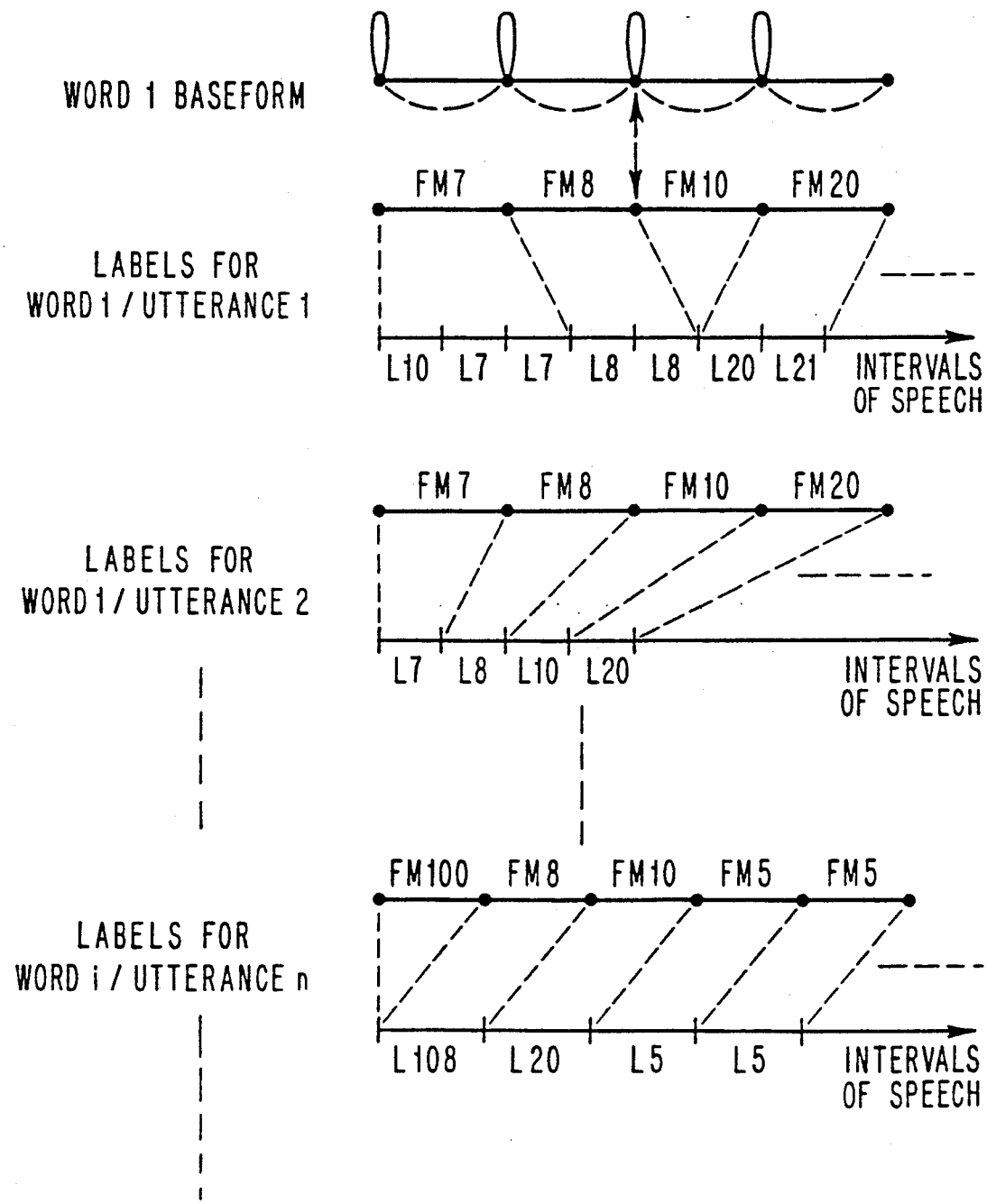
FIG. 7 is a diagram showing the Viterbi alignment process of associating Markov models with generated labels.

The $v_k^{in}$ values represent a correspondence between a kth label and a Markov model in the baseform for the word uttered. In FIG. 7, a baseform for a first word is shown to include the sequence of fenemic Markov models $F_7F_8F_{10}F_{20}$ ... When the first word is uttered a first time, the acoustic processor 202 generates labels L10, L7, L7, L8, L8, L20, L21, ... Looking first at label L10, the Viterbi alignment processor 502 maps label L10 to fenemic Markov model $F_7$ and stores the result in the memory location 1 of TABLE 2. The next two labels L7 and L7 are also aligned with the fenemic Markov model $F_7$. Accordingly, locations 2 and 3 in the first row under Viterbi Alignment storage in TABLE 1 store a map to $F_7$. The next two labels L8 and L8 are aligned with fenemic Markov model $F_8$ and the $v_k^{in}$ values stored therefor at locations 4 and 5 reflect this mapping. No labels are aligned with $F_{10}$. Labels L20 and L21 are aligned with fenemic Markov model $F_{20}$; and so on. As shown in FIG. 7, the process is repeated for successive utterances of successive words.

The manner in which labels and Markov models are aligned is discussed in numerous articles, such as "Continuous Speech Recognition by Statistical Methods", *Proceedings of the IEEE*, volume 64, pp. 532–556 (1976) and "A Maximum Likelihood Approach to Continuous Speech Recognition", *IEEE Transactions on Pattern Analysis and Machine Intelligence*, volume PAMI-5, Number 2, March 1983, by L. R. Bahl, F. Jelinek, and R. L. Mercer, which are incorporated herein by reference.

Figure 8:
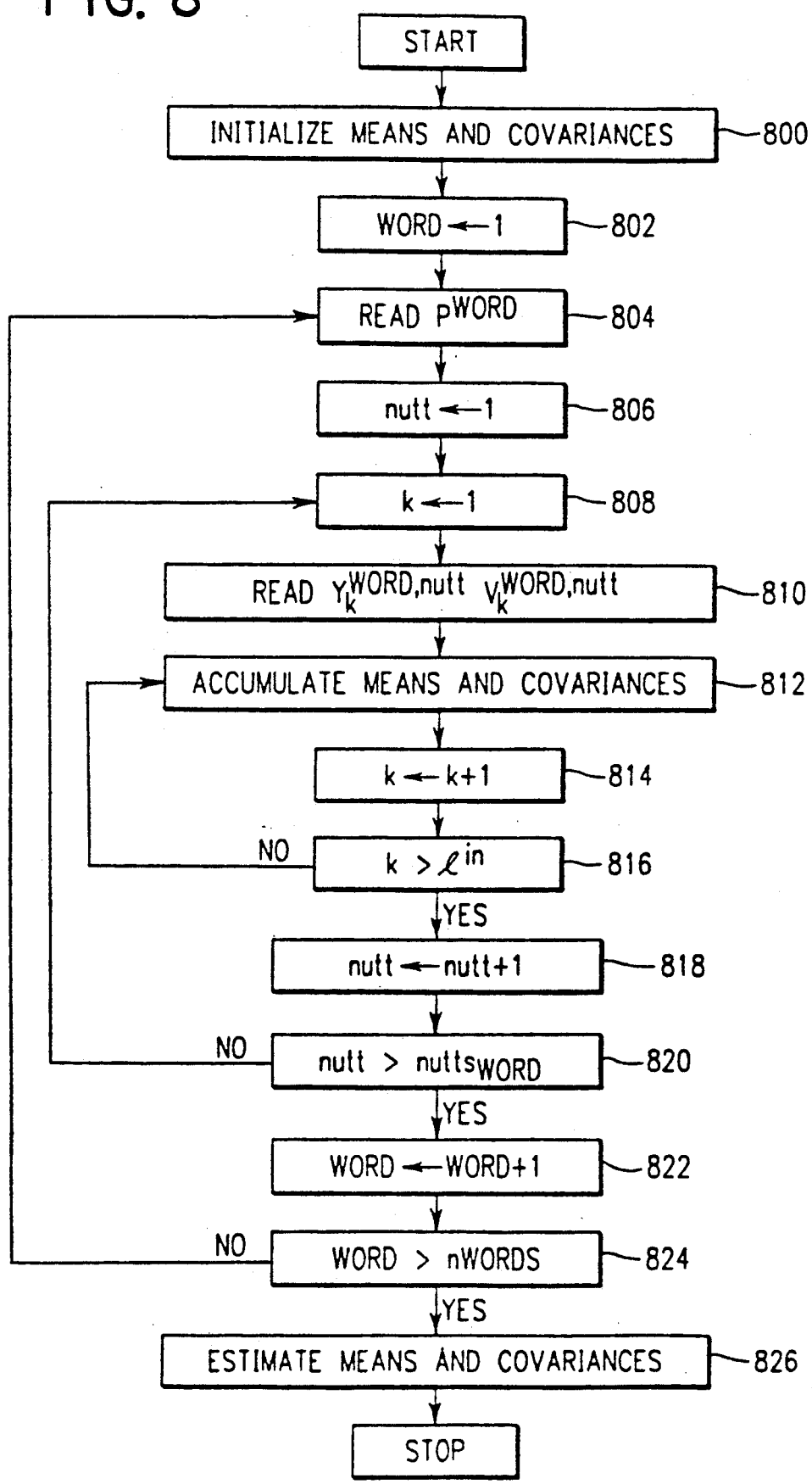
FIG. 8 is a flow diagram showing the steps in estimating the mean values and covariance values for each re-specified label.
Figure 9:
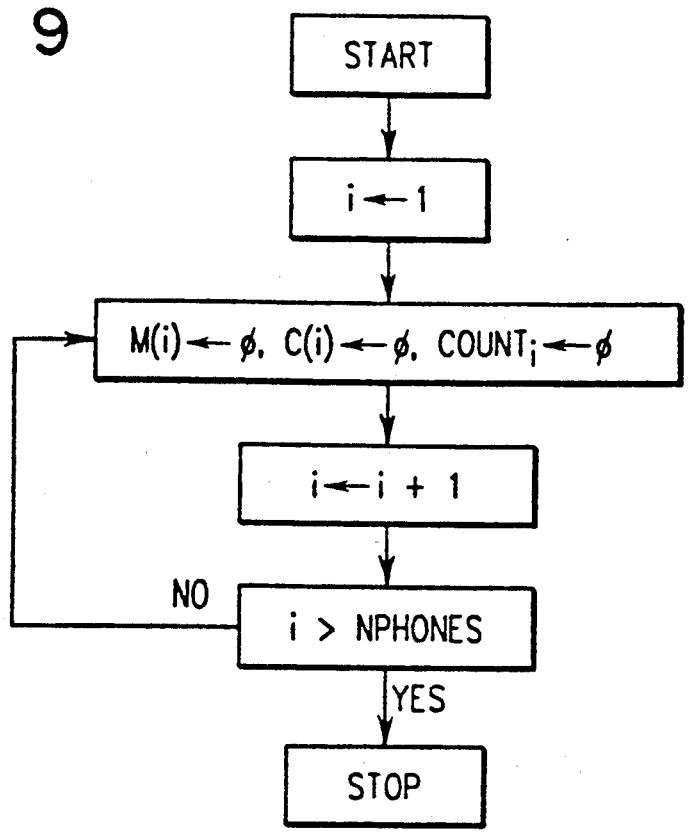
FIG. 9 is a flow diagram showing a preferred sequence of steps for initializing mean values and covariance values in FIG. 8.

Referring again to FIG. 5, the alignment results exit the Viterbi alignment processor 502 and enter a mean and covariance estimator 504. The mean and covariance estimator 504 also receives as input the successive feature vectors from which the acoustic processor 202 (of FIG. 2) derives labels. The feature vectors generated for each utterance of a word are stored in memory as shown in TABLE 1 under heading "Feature Vectors." The baseform structures are also provided as input to the mean and covariance estimator 504. The mean and covariance estimator 504 operates as set forth in the flowchart of FIG. 8. As discussed hereinabove, the estimator 504 operates to compute the mean of all feature vectors corresponding to labels generated for one fenemic Markov model after another. The covariances of the feature vectors associated with each fenemic Markov model are also computed.

In computing the means and covariances, the estimator 504 first initializes all means and covariances to zero in step 800. That is, the mean vector M(i) and covariance matrix C(i) and a count value COUNT (i) are set to zero for each ith fenemic Markov model. The total number of Markov models is identified by the variable Nphones.

Figure 10:
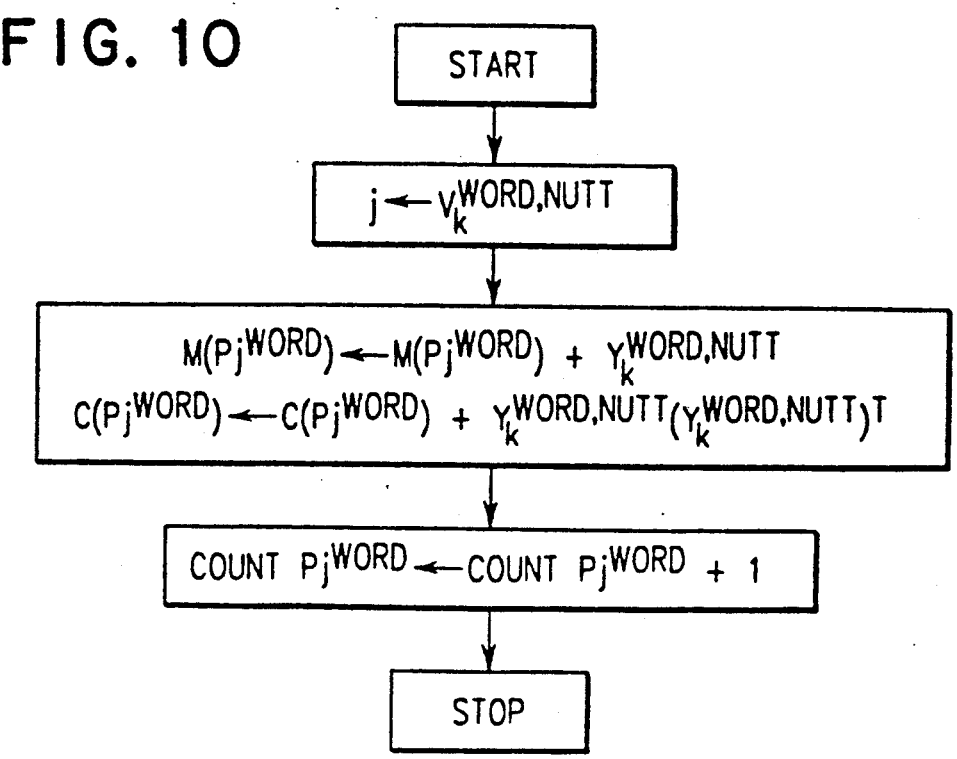
FIG. 10 is a flow diagram showing a preferred sequence of steps involved in accumulating mean values and covariance values in FIG. 8.

In step 802, the first word is selected. In step 804, the fenemic Markov models for the selected word are read as $p^{word}$. For the first utterance of the selected word, the first fenemic Markov model is selected by means of steps 806 and 808. At step 810, the feature vector for the kth label of a given jth utterance of an ith word and the $v_k^{in}$ value stored therefor are read. At step 812, means and covariances are accumulated as shown in FIG. 10.

That is, j is set to the value of $v_k^{in}$ and a mean value $M(p_j^{word})$ is up-dated by adding the feature vector $y_k^{in}$ to a previous value of the jth Markov model of the selected word, $M(p_j^{word})$. The covariance matrix $C(p_j^{word})$ is similarly up-dated by adding $y_k^{in} \times (y_k^{in})$ to the previous set of covariances. A count COUNT $(p_j^{word})$ is incremented from a previous value thereof by adding 1 thereto. It is recalled that each mean, covariance, and COUNT value is initially zeroed (in step 800).

The accumulation of mean and covariance values for each kth label is performed pursuant to the loop prompted by steps 814 and 816. Accumulated mean and covariance and COUNT values are computed for successive labels until k exceeds the number of feature vectors aligned against the given word (i.e., the first word in the first iteration) and utterance thereof. The process of accumulating means, covariances, and COUNTs involves iterating the steps 810 through 820 for successive utterances until all utterances of the first word are examined and processed. After all utterances for a given word are processed, the next word is selected at step 822 provided that all words have not been processed previously. For the next selected word, steps 804 through 822 are repeated. After all utterances of all nwords have been processed (Step 824), means and covariances M(i) and C(i) are estimated in step 826.

Figure 11:
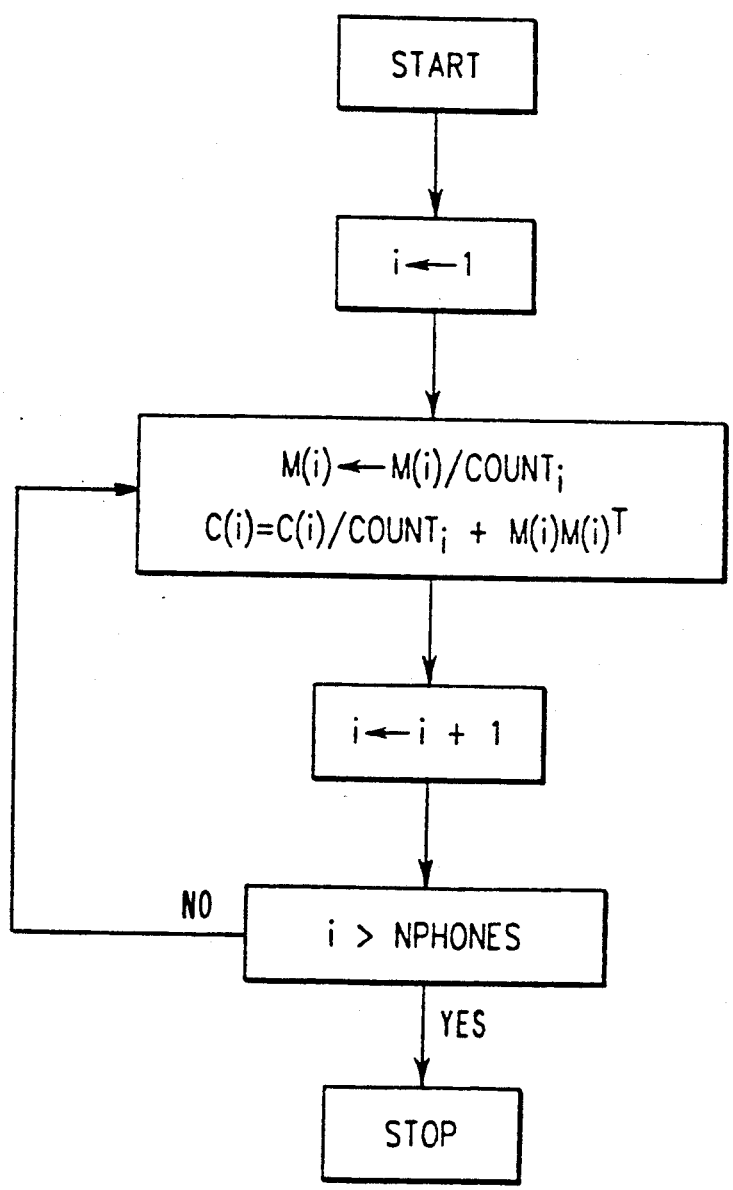
FIG. 11 is a flow diagram showing a preferred sequence of steps involved in the final estimating of mean values and covariance values in FIG. 8.

Step 826 is depicted in detail in FIG. 11. For each ith fenemic Markov model, the mean M(i) is computed as M(i)/COUNT(i) and the covariances are computed as $C(i) = [C(i)/COUNT(i)] + M(i)M(i)^T$. $M(i)^T$ is the transpose of M(i).

Referring again to TABLE 1, the storage of means and covariances in the memory of the re-labeller 210 is shown. A first row of memory has locations 1 through N and contains mean values $M_1(1)$ through $M_1(N)$ where N is the number of feature vectors for a given label and $M_i$ is the mean value for the ith label. A second row in the memory includes locations (N+1) through 2N, which contain mean values $M_2(1)$, through $M_2(N)$, respectively. The last row of memory for the mean values include locations $[N \times (n_{phones}-1)+1]$ which contain mean values $M_{nphones}(1)$ through $M_{nphones}(N)$ where $n_{phones}$ is the number of Markov models.

Also shown in TABLE 1 is storage of the covariances. In the first row thereof are locations 1 through $[N \times (N+1)/2]$ which contain covariances $C_1(1,1)$ through $C_1(N,N)$. The last row includes locations $[(n_{phones}-1) \times N \times (N+1)/2]+1$ through $n_{phones}(N \times (N+1)/2)$ which contain covariance values $C_{nphones}(1,1)$ through $C_{nphones}(N,N)$.

The means and covariances computed by the estimator 504 enter the label specifier 506 together with the parameter vectors generated by the acoustic processor 202 (of FIG. 2). The label specifier 506 up-dates the definitions of the labels in the label alphabet according to the flowchart of FIG. 12.

Figure 12:
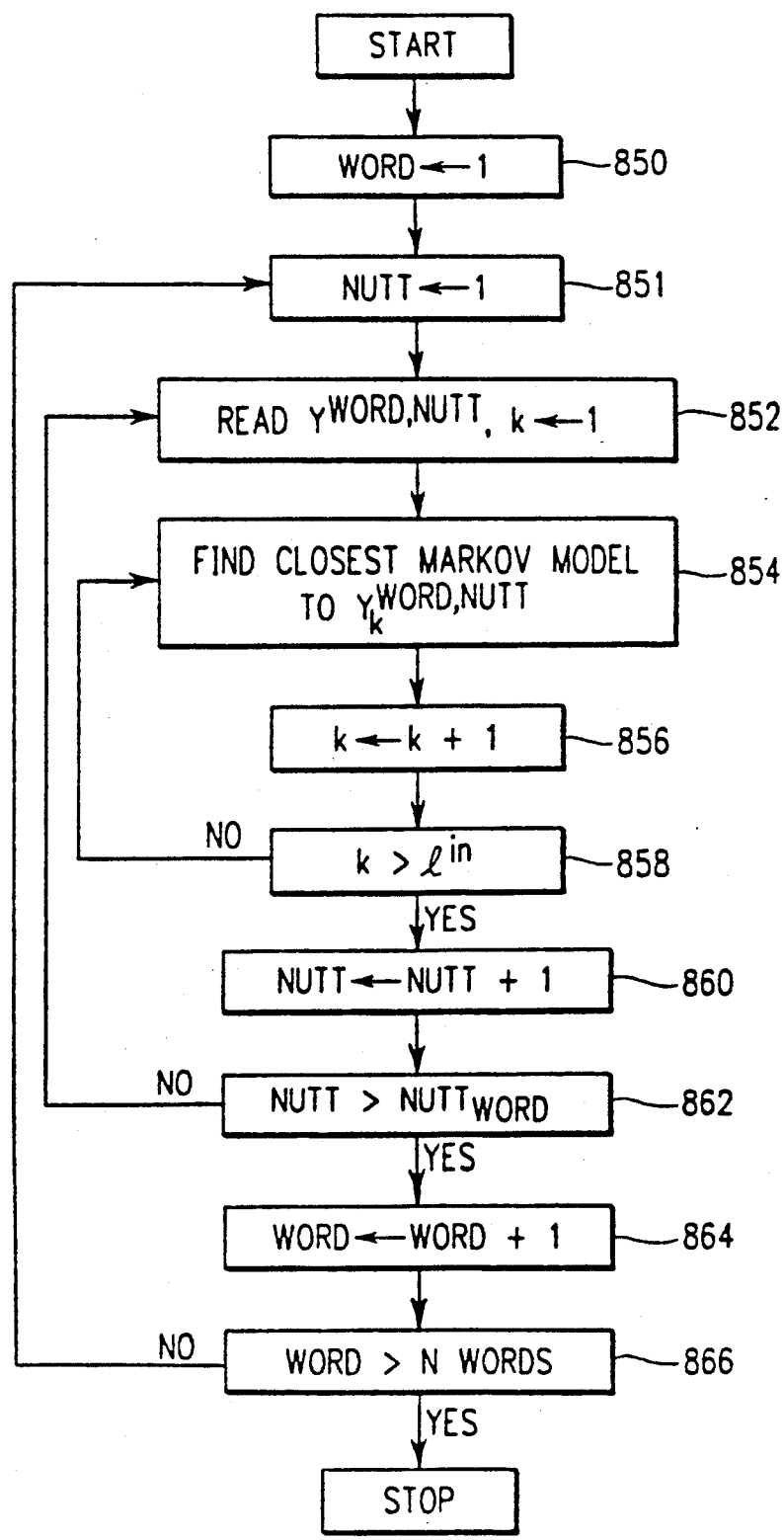
FIG. 12 is a flow diagram showing the steps involved in labelling speech data.

In FIG. 12, a feature vector $y_k^{word,nutt}$ is read. In the first iteration, the first feature vector in the string of labels generated for the first utterance of the first word—namely, $y_1^{1,1}$—is read (see steps 850, 851, 852, and 854). The closest Markov model to the feature vector is determined in step 854. Step 854 is expanded in FIG. 13.

Figure 13:
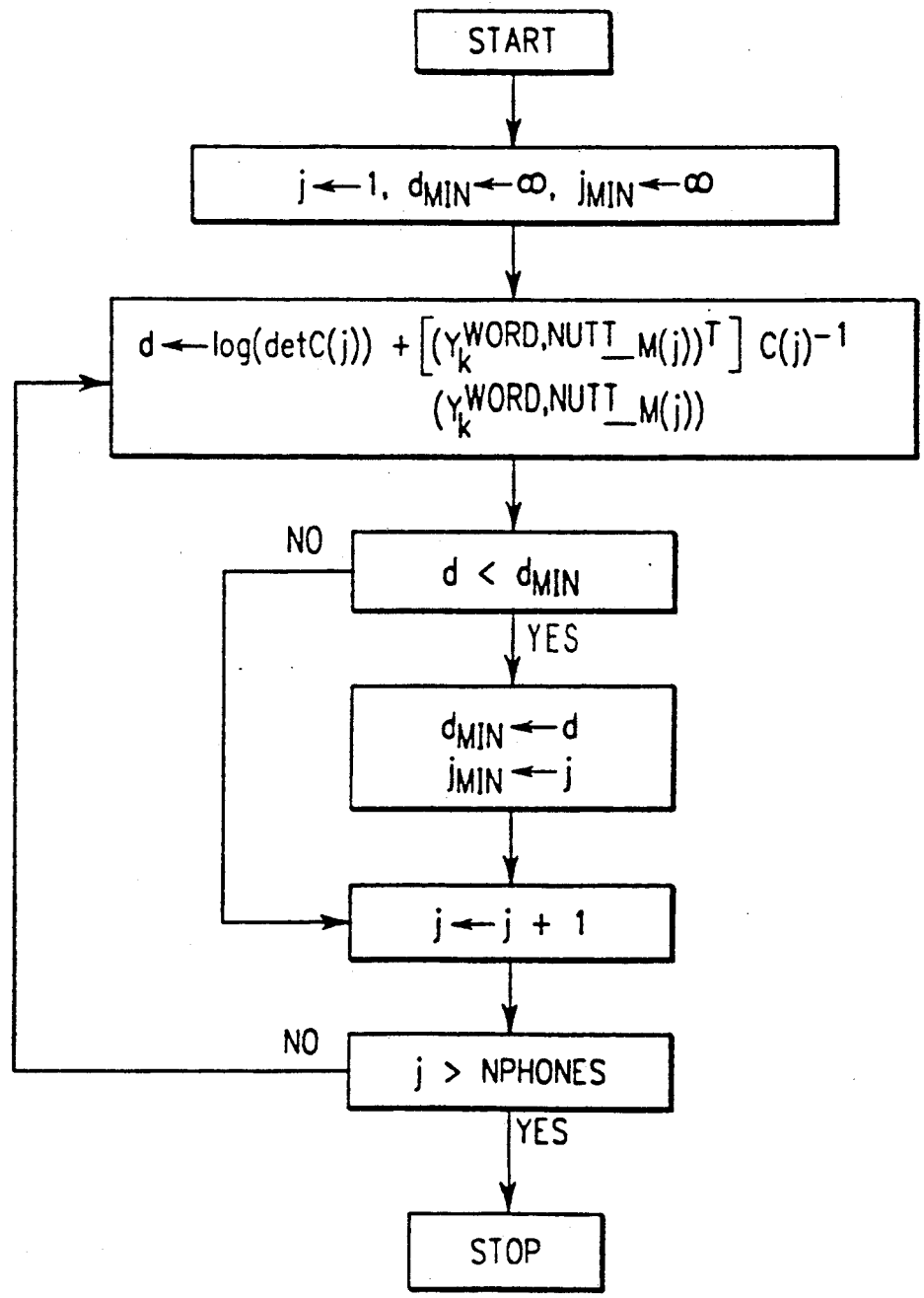
FIG. 13 is a flow diagram showing a preferred sequence of steps for determining the closest Markov model to a given feature vector.

Referring to FIG. 13, a distance measurement is made between the currently read feature vector and the mean and covariance values stored for each Markov model. Where M(j) corresponds to the mean value of the jth fenemic Markov model and C(j) corresponds to the covariance of the jth fenemic Markov model, the distance measurement is defined as:

$$d \leftarrow \log(\det C(j)) + [(y_k^{word,nutt} - M(j)^T)]C(j)^{-1}(y_k^{word,nutt} - M(j))$$

The distance measurement is performed for one fenemic Markov model after another with the j resulting in the minimum d value being stored as $j_{min}$, the closest fenemic Markov model for the kth feature vector.

Referring again to FIG. 12, one kth feature vector after another is processed until the closest fenemic Markov model for each feature vector in an utterance of a word have been determined (see steps 854, 856, and 858). Successive utterances of the current word are processed according to steps 852 through 862 until all utterances of the current word have been processed. Accordingly, all feature vectors for one utterance of the current word after another are processed to determine the respective closest fenemic Markov models therefor. Thereafter a next word is selected, with steps 850 through 866 being performed for each word until all nwords have been processed.

In reviewing FIG. 12, it is observed that for each fenemic Markov model there are mean and covariance values stored therefor. These values for a given fenemic Markov model define the prototype vector and cluster of the label that correlates to the given fenemic Markov model. Hence, for a generated feature vector, a distance measurement is made using the mean M(j) and covariance C(j) of each jth Markov model and the $j_{min}$th label (which correlates to the $j_{min}$th fenemic Markov model).

Given the re-specified labels and fenemic Markov models correlated thereto, new word baseforms are constructed based on the up-dated data. The constructing of fenemic word baseforms is described in detail in the aforementioned allowed copending patent application "Speech Recognition System" by Bahl et al., Ser. No. 845,155 filed Mar. 27, 1986, now U.S. Pat. No. 4,718,09 and in the co-pending patent application "Improving the Training of Markov Models Used in a Speech Recognition System" by Bahl, et al., Ser. No. 845,201 filed Mar. 27, 1986, now U.S. Pat. No. 4,827,521. The above-cited patent applications are incorporated herein by reference to the extent required for adequate disclosure of the present invention. A discussion of baseform growing is also included hereinbelow, briefly outlining the method of applying the Forward-Backward algorithm in constructing Markov model sequences for words. The memory of TABLE 1, under the headings of "Baseforms" and "Statistics", are updated as new baseforms and probability statistics therefor are computed.

B. Constructinq A Fenemic Markov Model Word Baseform

A simple method of forming fenemic Markov model baseforms involves uttering each word once at a known time. The string of labels generated by the acoustic processor 202 (of FIG. 2) for a known word at a known time is noted. The fenemic models for the generated labels are concatenated to form a fenemic Markov model word baseform. For a known word XXX, for example, suppose that the labels L1-L5 L5-L6- ... are generated. Based on the single utterance method, the fenemic Markov model baseform for the word XXX is $F_1F_5F_5F_6$...

An alternative, preferred feneme-based Markov model word baseform is constructed based on multiple utterances of a word. In this approach, the word baseforms account for variations in pronunciation of a given word. One method for achieving this end is set forth in the co-pending patent application entitled "Constructing Feneme-based Markov Models of Words from Multiple Utterances" by Bahl et al., Ser. No. 738,933 filed May 29, 1985, now U.S. Pat. No. 4,759,068.

In the application noted immediately hereinabove, the steps listed below are followed in constructing the fenemic baseform for each word segment (e.g. each word or predefined syllable or part thereof) in a vocabulary. Specifically, a method is provided which includes the steps of: (a) transforming each of multiple utterances of the word segment into a respective string of labels; (b) defining a set of fenemic Markov models; (c) determining the best single model P1 for producing the multiple label strings; (d) determining the best two model baseform of the form P1P2 or P2P1 for producing the multiple label strings; (e) aligning the best two-model baseform against each label string; (f) splitting each label string into a left portion and a right portion with the left portion corresponding to the first model of the two-model baseform and the right portion corresponding to the second model of the two-model baseform; (g) identifying each left portion as a left substring and each right portion as a right substring; (h) processing the set of left substrings in the same manner as the set of label strings corresponding to the multiple utterances including the further step of inhibiting further splitting of a substring when the single model baseform thereof has a higher probability of producing the substring than does the best two-model baseform; (j) processing the set of right substrings in the same manner as the set of label strings corresponding to the multiple utterances, including the further step of inhibiting further splitting of a substring when the single model baseform thereof has a higher probability of producing the substring than does the best two-model baseform; and (k) concatenating the unsplit single models in an order corresponding to the order of the label substrings to which they correspond. In a particular embodiment, the method includes the further steps of: (l) aligning the concatenated baseform against each of the label strings and identifying, for each model in the concatenated baseform, the substring in each label string which corresponds thereto, the substrings corresponding to a given model being a set of common substrings; (m) for each set of common substrings, determining the model having the highest joint probability of producing the common substrings; and (n) for each common substring, replacing the model therefor in the concatenated baseform by the determined model of highest joint probability; the baseform resulting from the replacing of models being a refined baseform. If the steps (l) through (n) are repeated until no models are replaced, a further refined baseform is achieved.

Figures 14, 14A:
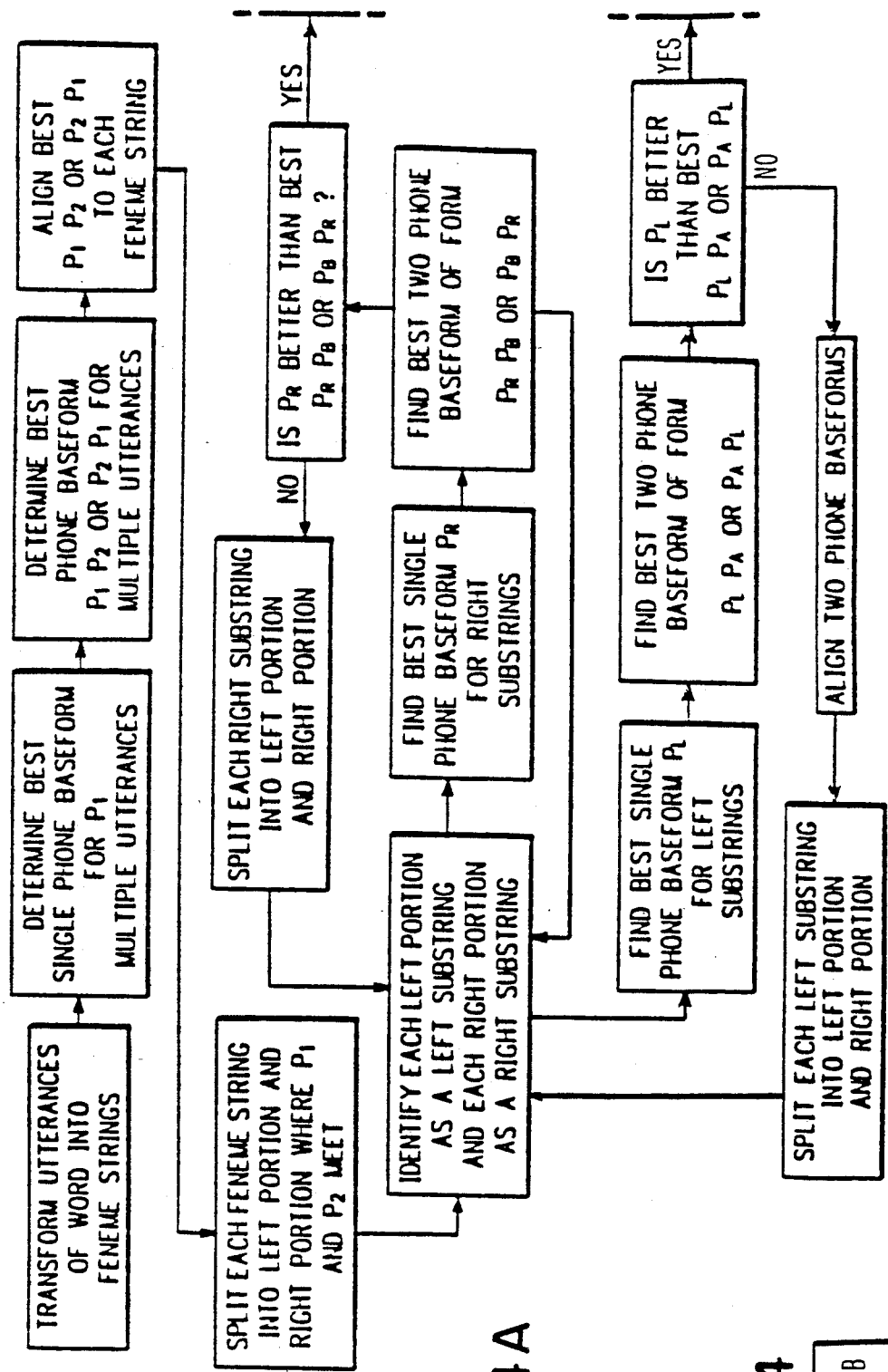
FIGS. 14, 14A, and 14B show steps involved in constructing Markov model word baseforms based on multiple utterances of words.
Figure 14B:
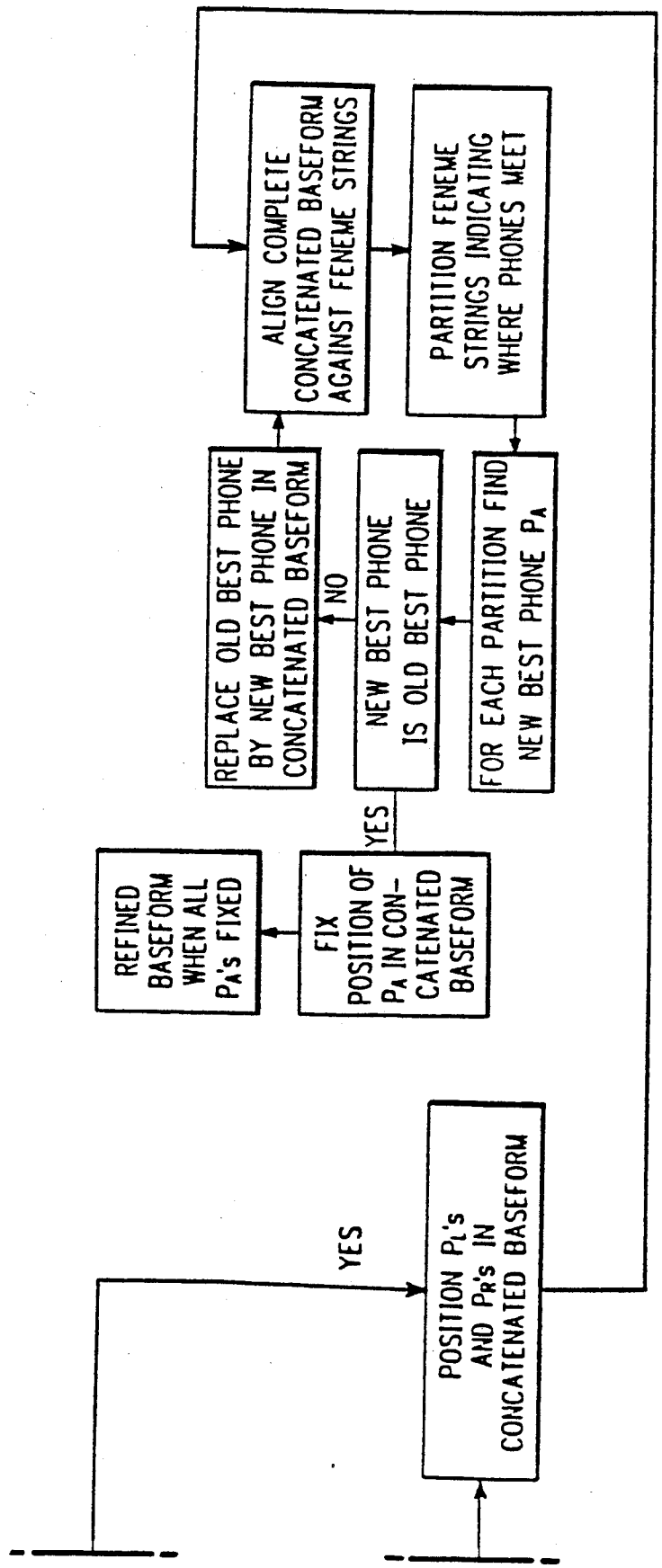

The flowchart of FIG. 14 illustrates a preferred methodology for constructing fenemic word baseforms from multiple utterances. In the flowchart, the term "phone" corresponds to Markov model. Hence, a single phone baseform is a baseform constructed of a single Markov model. Also, P1 and P2 correspond to two phones— that is, two Markov models Basically, a divide-and-conquer strategy is employed.

C. Determining Transition Probabilities and Label Output Probabilities

Transition probabilities and label output probabilities (i.e., probability items) stored in TABLE 1 are defined in terms of "counts" A "count" typically defines the (expected) number of times a particular event occurs In the present context, there are "single counts" and "cumulative counts." Unless otherwise specified, the term "count" when used alone means "single count".

The probability items are computed based on data accumulated during a training session in which known words—each represented as a known sequence of fenemic Markov models—are uttered and a string of labels are generated.

That is, given estimated values $\Theta'$ for the probability items and the string of labels generated during the training session, a "single count" is computed as the probability of a particular transition $\tau_i$ and state $S_j$ given (a) a certain string Y of labels, (b) defined estimated values $\theta'$, and (c) a particular time t. Each above-described single count is determined by applying the well-known forward-backward algorithm.

According to the above definition, the single count may be represented by the expression:

$$\Pr(S_j, \tau_i | Y, \Theta', t)$$

In computing the single counts set forth above, the $\theta'$ may be omitted as implicit in a probability characterized as Pr'. Applying Bayes Theorem, the expression becomes:

$$\Pr'(\tau_i, S_j, Y | t)/\Pr'(Y)$$

Pr' (Y) is the probability derived from the forward pass probability computed using the parameters $\theta$ in the wellknown Forward-backward algorithm. The problem is thus reduced to computing the probabilities:

$$\Pr'(\tau_i, S_j, Y | t) \text{ for all } i,t$$

which—for each i,t—represents the probability that a given Markov model produces the label string Y and that transition $\tau_i$ of the Markov model is taken at time t.

By summing the single counts for a specific $S_j$, $\tau_i$, Y, and $\Theta'$ for each time t, a transition "cumulative count" is determined for a corresponding transition probability item. Because the transition cumulative count is a sum of probabilities, its value may exceed unity. For each transition probability item, a respective cumulative count is stored. By dividing this cumulative count for a given transition by the sum of cumulative counts for all transitions which can be taken from the same initial state as that for $\tau_i$, a current probability value for the respective transition probability item is computed. The current probability value is preferably stored and associated with its respective transition probability item.

Each transition probability item, it is noted, is preferably defined in estimated form as:

$$\Pr(\tau_i | S_j) = \frac{\sum_{t=1}^{T+1} \Pr'(S_j, \tau_i | Y, t)}{\sum_{k=1}^{K} \sum_{t=1}^{T+1} \Pr'(S_j, \tau_k | Y, t)}$$

From the above equation, it is evident that each transition probability is defined in terms of counts. The numerator is a cumulative count—the sum of single count values for a given transition $T_i$ at any time through time $T+1$—while the denominator represents the sum of single count values taken over all possible transitions $T\tau_1$ through $\tau_K$, which have the same initial state as $\tau_i$ taken over all times through time $T+1$.

Furthermore, it is noted that each label output probability at any non-null transition is preferably also defined in terms of counts. That is, an estimated label output probability Pr' for a label $f_h$ being produced given a transition $\tau_i$ and state $S_j$ is mathematically represented as:

$$\Pr'(f_h | \tau_i, S_j) = \frac{\sum_{t: y_t = f_h} \Pr'(S_j, \tau_i | Y, t)}{\sum_{t=1}^{T} \Pr'(S_j, \tau_i | Y, t)}$$

where $f_h$ corresponds to a specific label selected from the alphabet of labels and $y_t$ corresponds to the label generated at a time interval t.

Each summed term in the numerator represents the probability that a label $y_t$ generated in the string Y is label $f_h$ and tha label $y_t$ was produced on transition $\tau_i$ out of state $S_j$, given that the generated label output was the string Y.

The sum in the numerator is a label "output cumulative count" and is preferably stored with the associated label output probability item corresponding therewith. By dividing this cumulative count by the sum of single counts over all label times for the specific $S_j$, $\tau_i$, Y, and $\Theta'$, a current probability value is determined for the respective label output probability item.

The transition probabilities and label output probabilities are accordingly readily computed from the counts after an iteration of count adjustment.

D. Determining Values for Counts

In determining the values for the counts, the well-known forward-backward algorithm is used. For all values of i, j, and t, that is, the value of Pr′ $(S_j, \tau_i | Y, t)$ is determined and stored as a value for a respective count.

A detailed description of the forward-backward algorithm is set forth in Appendix III of the above-cited article entitled "Continuous Speech Recognition by Statistical Methods".

Figure 15:
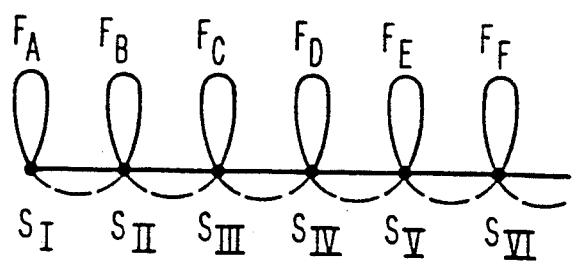
FIG. 15 is a diagram depicting a sequence of fenemic Markov models.

The basic concept of the forward-backward algorithm is now discussed with reference to FIG. 15, FIG. 16, and FIG. 17. In FIG. 15, six fenemic Markov models $F_A$, $F_B$, $F_C$, $F_D$, $F_E$, and $F_F$ are shown in a sample word baseform Although word baseforms typically extend over sixty to one hundred fenemic Markov models, for purposes of explanation it is assumed that the sample word baseform starts at state $S_I$ and ends at state $S_{VI}$. For purposes of this example, it is assumed that four labels $f_a$, $f_b$, $f_c$, and $f_d$ are generated between states $S_I$ and $S_{VI}$, the final state of the word baseform, when an utterance of the sample word is processed by the acoustic processor 202.

From a known method or a measured interval of silence, it is assumed that the end of the sample word is known to be time interval $t_4$. Each time interval, it is noted, represents a time during which a label is produced. Preferably, each interval is one centisecond.

It is observed that there are a plurality of paths which may be followed in producing four labels between states $S_I$ through $S_{VI}$ ending at time $t_4$.

Figure 16:
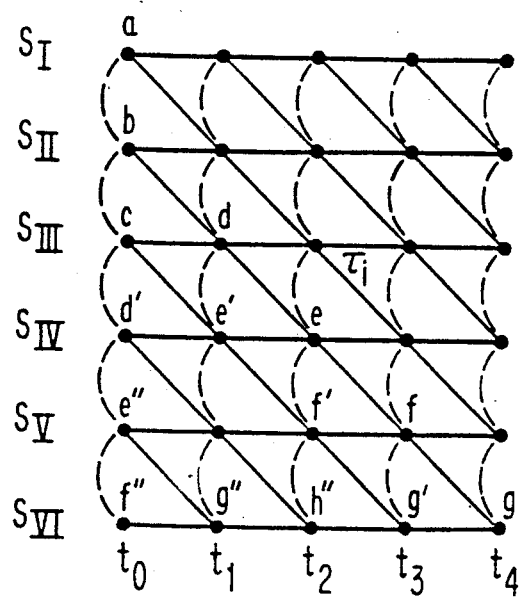
FIG. 16 is a trellis diagram showing the states and arcs of the Markov model sequence of FIG. 15 at various time intervals.

The trellis of FIG. 16 illustrates the optional paths which may be followed. That is, point "a" in the trellis represents the first state of the first Markov model in the baseform—$F_A$—at time $t_0$. Proceeding vertically downward from point "a" to point "b" indicates that the null arc of model $F_a$ is taken to state $S_{II}$. Proceeding horizontally to the right of point "a" suggests that the non-null loop of model $F_A$ is followed and the first label is produced. Proceeding diagonally downward to the right of point "a" indicates that the non-null arc extending from state $S_I$ to state $S_{II}$ is followed and the first label is produced thereat. A similar analysis applies at the various time intervals for the successive states shown in the trellis.

In generating four labels, extending between states $S_I$ through $S_{VI}$ ending at time interval $t_4$, one path would proceed along the points a-b-c-d-e-f-g. The four labels would be produced at the arcs c-d, d-e, e-f, and f-g. A second path would proceed along the following points a-b-c-d′-e′-f′-g′-g. The four labels would be produced at arcs d′-e′, e′-f′, f′-g′, and g′-g. Still a third path would follow the points a-b-c-d′-e″-f″-g″-h″-g′-g. In this third path, the labels would be produced at arcs f″-g″, g″-h″, h″-g′, and g′-g. Several other paths are also possible.

Figure 17:
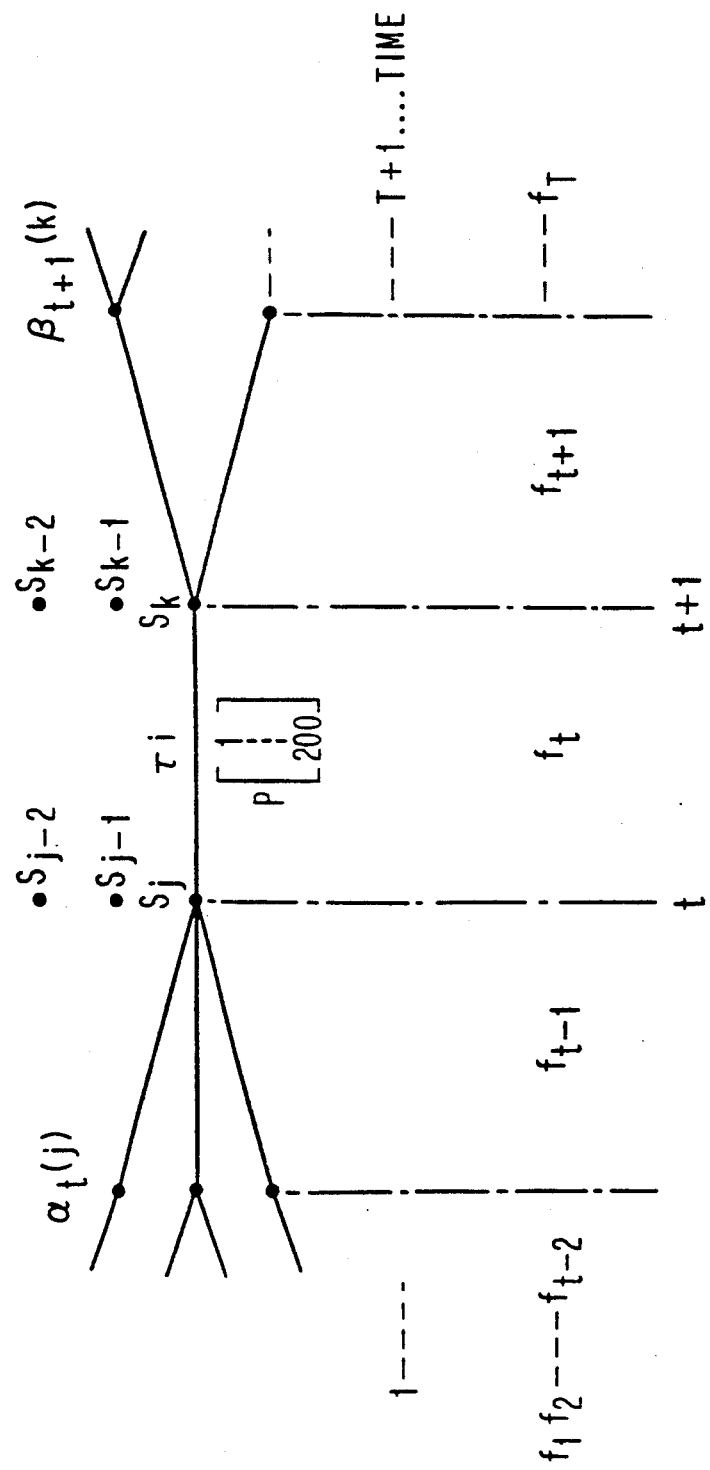
FIG. 17 is a diagram illustrating the forward-backward algorithm as applied to a given arc in the trellis diagram of FIG. 17.

In employing the forward-backward algorithm, the probability of following an arc $\tau_i$ between states $S_j$ and $S_k$ to produce a label $f_t$ at a time t is determined As depicted in FIG. 17, this is done by computing three elements in a probability product.

First, based on the various optional paths in arriving at state $S_j$ from an initial state $(S_I)$ while producing labels $f_1$ through $f_{t-1}$, a forward pass probability is determined for the probability Pr′ $(S_j, \tau_i | Y, t)$. This component $\alpha_t$ denoted (j). The second component of the product is the probability of taking transition $\tau_i$ from state $S_j$ and producing label $f_t$. This may be expressed as:

$$Pr(\tau_i | S_j) Pr(f_t / 51\ S_j, \tau_i)$$

This second component is based on the previously defined current value stored for a transition probability item (at transition $\tau_i$) or for a label output probability item (for label $f_h$).

The third component of the product is denoted as $\beta_{t+1}(k)$. This third component represents the probability of producing labels $f_{t+1}$ through $f_T$ starting at state $S_k$ (at time t+1).

When $\tau_i$ represents a null transition, the components become simplified because there is no requirement that a particular label be produced during the examined transition.

The $\alpha$ probability is also identified as Pr(S,t). Successive $\alpha$'s are determined recursively starting at time 1 according to the expressions:

$$\alpha_1(1) = 1.0$$

$$\alpha_t(S) = \Sigma_{\sigma \epsilon m(S)} \alpha_{t-1}(\sigma) Pr(f_t, \sigma \to S) + \Sigma_{\sigma \epsilon n(S)} \alpha_t(\sigma) Pr(\sigma \to S) \text{—if } t > 1\text{—}$$

where n(S) represents the set of states having a null transition to state S and m(S) represents the set of states having a non-null transition to state S. In accordance with the forward pass, for times 1, 2, . . . ,T+1 in sequence, the value of $\alpha_t(S)$ is computed for S=1, 2, . . . , $S_F$ in sequence where $S_F$ is the final Markov model state. This is performed by solving the expression for $\alpha$ recursively. Calculation proceeds forward in time and forward through the states.

The backward pass involves determining the probability $\beta_t(S)$, the probability of completing the output string of labels starting from state S at time t. The $\beta$'s satisfy a similar computation as do the $\alpha$'s. The main difference is that the forward pass starts at state 1 and moves forward in time therefrom whereas the backward pass starts at the final state ($S_F$) and proceeds backward in time, and backwards through the states.

With N(S) representing the set of states which can be reached from S through a null transition, and M(S) representing the set of states which can be reached from S through a non-null transition, the following expressions apply:

$$\beta_{T+1}(S_F) = 1.0$$

$$\beta_t(S) = \Sigma_{\sigma \epsilon M(S)} Pr(f_t, S \to \sigma) \beta_{t+1}(\sigma) + \Sigma_{\sigma \epsilon N(S)} Pr(S \to \sigma) \beta_t(\sigma) \text{—if } t \leq T.$$

In the backward pass, then, for times=T+1, T, . . . , 1—in sequence—values of $\beta_t(S)$ are computed for $S_F$, $S_{F-1}$, . . . , 1 in sequence using the above recursive expressions.

With the three components determined for each given i, j, and t, the count values corresponding thereto are readily computed.

E. Speech Recognition System Environment

The labels and word baseforms which are defined interdependently are employed in a speech recognition system like that described in the patent application "Speech Recognition System" by Bahl et al., Ser. No., 845,155 filed Mar. 27, 1986, U.S. Pat. No. 4,718,094.

Figure 18:
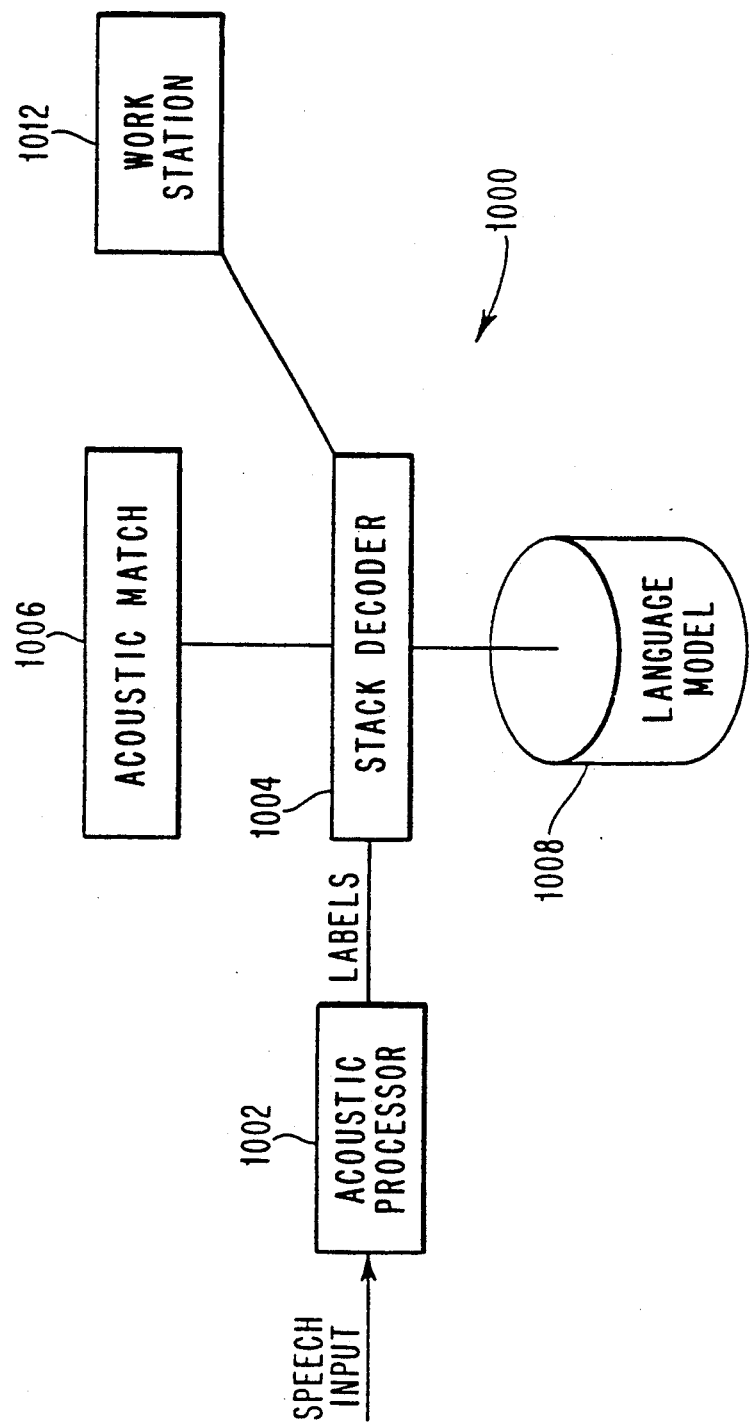
FIG. 18 is a block diagram showing a speech recognition system in which labels and word baseforms formed interdependently are used in recognizing words from uttered speech inputs.

A general diagram of a Markov model speech recognition system 1000 is shown in FIG. 18. FIG. 18 includes an acoustic processor 1002. The acoustic processor 1002 operates like the acoustic processor 202 (of FIG. 2). Accordingly, at successive intervals (e.g., centisecond intervals), successive labels from an alphabet of re-specified labels are selected as corresponding to the feature vectors detected at successive time intervals.

The labels enter a stack decoder 1004 to which is connected an acoustic match processor 1006, a language model processor 1008, and a work station 1010. The acoustic match processor 1006, in effect, performs a matching of the labels generated by the acoustic processor 1004 with word baseforms constructed interdependently with the re-specified labels (in step 302 of FIG. 3). Statistical data for the word baseforms is stored as shown in TABLE 1 for each. The acoustic match processor 1006 includes word baseforms—i.e., respective Markov model sequences for the vocabulary words—with probability statistics stored for each arc and label output probability. (The probability statistics are determined during the training session.)

The sequence of Markov models for each word is derived from the baseform dictionary 208 (of FIG. 2). That is, after the labels are re-specified for the last time and baseforms are constructed therefrom, the sequence of Markov models in the baseform is set for the speech recognizer of FIG. 18. For each speaker, the same sequence of Markov models is applied. As in the case of phonetic Markov models in which the word "THE" is represented by the three Markov model sequence DH—UH1—XX for all speakers, the present invention provides the same sequence of fenemic Markov models for each given word regardless of speaker.

For each speaker, however, the probability statistics applied to the sequence of fenemic Markov models for a given word vary. Stated otherwise, for each speaker, there is provided an alphabet of labels having parameter values characteristic of the subject speaker. Based on his alphabet of labels and based on the labels generated in response to the speaker uttering a sample text—which corresponds to a known sequence of fenemic Markov models—the arc and label output probabilities of the Markov models are determined for the subject speaker.

Accordingly, the interdependent re-specifying of labels and construction of word baseforms is used in defining a universal sequence of fenemic Markov models for each word. Given the sequence for each word, each speaker utters the sample text to "train"—that is, compute and store probabilities for—the fenemic Markov models Training a Markov model speech recognizer is discussed in the co-pending patent application entitled "Improving the Training of Markov Models Used in a Speech Recognition System".

For a given string of labels, the acoustic match processor 1006 determines a likelihood score for words in the vocabulary—based on the computed and stored acoustical probability data for the fenemic Markov models.

The language model 1008 is based on word sequence data previously stored. Typically, millions of words are scanned and the number of times each sequence of m words ($1 \leq m$) occurs is tallied. In determining the language model score of a subject word as being the next word, the language model 1008 concatenates the subject word with two likely preceding words to form a subject tri-gram. Looking at the data base of word sequences and the number of times the subject tri-gram occurred in the data base text, a context likelihood is determined. If the word tri-gram did not occur in the data base, the subject word and the likely preceding word are considered as a bi-gram. The counts of the pair of words in the data base is then retrieved, If the pair did not occur in the data base, the likelihood of the subject word occurring alone in the data base is considered. A more detailed description of a language model processor 1008 is set forth in the copending patent application "Apparatus and Method for Estimating, from Sparse Data, the Probability that a Particular One of a Set of Events is the Next Event in a String of Events" by S. Katz, Ser. No. 844,904, filed on Mar. 27, 1986. The language model processor 1008 is of major value in distinguishing between homonyms or phrases which can be represented similarly acoustically but are distinct contextually.

The stack decoder 1004 uses input from the acoustic processor 1006 and the language model 1008 in determining which sequences of words are sufficiently likely to warrant consideration as the sequence of words corresponding to a given speech input. Details of the stock decoder 1004 are set forth in a co-pending patent application "Apparatus and Method for Determining a Likely Word Sequence from Labels Generated by an Acoustic Processor" by Bahl et al., Ser. No. 738,911 filed on May 29, 1985, now U.S. Pat. No. 4,748,670, which is incorporated herein by reference to the extent required for adequate disclosure.

The interdependent labels and Markov model word baseforms result in improved performance of the speech recognition system of FIG. 18.

A preferred mode of the speech recognizer of FIG. 18 includes: (a) an IBM 4341 mainframe computer on which the stack decoding is performed; (b) three FPS 190L array processors for performing (i) detailed acoustic matching and approximate acoustic matching for producing a list of likely word candidates to which detailed matching is applied (see acoustic match 1006) and (ii) acoustic processing (see acoustic processor 1002) in which speech input is converted into labels, respectively; and a bank of IBM 3350 DASD units on which the statistics for the language model are stored.

The interdependent re-specifying of labels and construction of baseforms as described hereinabove is, in a specific embodiment, implemented on an IBM 3090 mainframe computer with memory storage sufficient to store the following items:

Feature vectors - - - 10 kilobytes/word
Word Baseforms - - - 1 kilobyte/word
Probabilities - - - 200 kilobytes
Alignment data - - - 0.4 kilobytes/word
Label (Prototype vector) data - - - 200 kilobytes
Label IDs (fenemes) - - - 200 bytes/word While the invention has been described with reference to preferred embodiments thereof, it will be understood by those skilled in the art that various changes in form and details may be made without departing from the scope of the invention.

We claim:

1. Speech processing apparatus comprising:
    an acoustic processor for producing as a first output, in response to speech input, one label after another at successive time intervals, each label being selected from an alphabet of labels, each label having parameter values;
    dictionary means for storing statistical data for each of a plurality of vocabulary words as Markov model word baseforms, wherein each baseform is characterized by a sequence of Markov models, at least one word baseform containing at least one Markov model at different locations in the sequence, each Markov model having a plurality of arcs, wherein the dictionary means includes storage for (i) the respective probability of each arc in each Markov model, and (ii) a respective probability of producing each label in the alphabet at each of some arcs in each Markov model means, coupled to said acoustic processor, for re-specifying the parameter values of the labels in the alphabet which can be produced as outputs of the acoustic processor; and baseform constructor means, coupled to said dictionary means, for up-dating the stored data for the Markov model word baseforms from labels generated by the acoustic processor based on the re-specified parameter values;

wherein said label re-specifying means re-specifies the parameter values of labels based on the updated stored data for the Markov model word baseforms;

wherein said acoustic processor produces as a second output one feature vector after another at the successive time intervals;

wherein each different Markov model corresponds to one respective label; and wherein said label re-specifying means includes:

alignment processor means for aligning a string of labels generated by the acoustic processor against a word baseform stored in the dictionary means, said alignment processor means aligning successive substrings in the string with successive Markov models in the word baseform; and estimator means for receiving as input from the acoustic processor the feature vectors corresponding to the labels aligned with a given Markov model and computing means and covariance values of the feature vectors received for the given Markov model; and label specifier means, coupled to the estimator means, for storing (i) the mean and covariance values of the feature vectors corresponding to the labels aligned with each Markov model, as (ii) the parameter values of the label corresponding to the Markov model.

2. Apparatus as in claim 1 wherein said acoustic processor includes:

means for comparing each successive feature vector generated by the acoustic processor against the mean and covariance values associated with each label and determining which means and covariance values are closets to the feature vector; and means for assigning to each successive interval the label with associated mean and covariance values closet to the feature vector at said each interval.

3. Apparatus as in claim 2 further comprising:

training means for computing Markov model data based on a string of labels generated by the acoustic processor in response to the utterance of a known text during the training session;

said training means being connected to enter the Markov model data into said baseform constructor means.

4. Apparatus as in claim 3, further comprising:

acoustic match means for (a) storing the word baseforms and the Markov model data computed therefor by said training means and (b) computing the measure of match between a string of labels generated by said acoustic processor and the sequence of Markov models for each word baseform.

5. Apparatus as in claim 4 further comprising:

language model processor means for storing occurrence data of word sequences derived from sample database text and for computing a likelihood score of each word based on the stored occurrence data; and stack decoder means, connected to receive as inputs (i) language model likelihood scores for words as computed by said language model processor means and (ii) acoustic match scores for words as computed by said acoustic match means, for selecting likely next words for each of a plurality of word paths based on the acoustic match scores and language model scores computed for the words;

said stack decoder means including means for computing, for each word path having a likelihood above a prescribed threshold, the likelihood of said each path after selected words are appended thereto.

6. A computerized method of processing speech for speech recognition comprising the steps of:

(a) generating, in an acoustic processor, one feature vector after another for one time interval after another in response to uttered speech, each feature vector having a feature value;

(b) for each time interval, assigning one of an alphabet of stored labels thereto which corresponds to one prototype vector of an alphabet of prototype vectors, each prototype vector having parameter values, the parameter values of said one assigned prototype vector being the closest to the feature value of the feature vector generated for a given time interval;

(c) storing each word of a vocabulary in a computer memory as a sequence of Markov models, at least one word containing at least one Markov model at different locations in the sequence, which includes the steps of:

selecting a set of Markov models wherein each Markov model corresponds to a label; and storing, for each Markov model, a plurality of arc probabilities and label probabilities, wherein each label probability corresponds to the likelihood of a respective label being produced at a given Markov model arc;

(d) for an uttered known word sequence, aligning labels which are generated according to step (a) with each successive Markov model included in the known word sequence; and (e) for a subject Markov model, re-specifying the prototype vector based solely on the feature vectors corresponding to each label aligned with the subject Markov model and associating the re-specified prototype vector with the label corresponding to the subject Markov model.

7. The method of claim 6 comprising the further step of:

(f) repeating step (e) for each Markov model as the subject Markov model.

8. The method of claim 6 wherein step (e) includes the steps of:

(g) computing and storing the mean and covariance values over all the feature vectors corresponding to the labels aligned with the subject Markov model; and (h) re-specifying the parameters of the label corresponding to the subject Markov model as the mean and covariance values computed in step (g) for the subject Markov model.

9. The method of claim 8 comprising the further step of:

(j) repeating step (e) for each Markov model as the subject Markov model.

10. The method of claim 9 comprising the further steps of:
(k) for an uttered known word sequence, (i) generating successive feature vectors, (ii) comparing each feature vector against the mean value and covariance value computed in step
(g) for each label, and (iii) assigning to each interval the re-specified label having the closest mean value and covariance value to the feature vector corresponding to the interval; and
(l) re-constructing the word baseforms based on the respecified labels.

11. The method of claim 10 wherein step (l) includes the steps of:
(m) transforming each of multiple utterances of the word segment into a respective string of labels;
(n) determining the best single Markov model P1 for producing the multiple label strings;
(p) determining the best two-model baseform of the form P1P2 or P2P1 for producing the multiple label strings;
(q) aligning the best two-model baseform against each label string;
(r) splitting each label string into a left portion and a right portion with the left portion corresponding to the first model of the two-model baseform and the right portion corresponding to the second model of the two-model baseform;
(s) identifying each left portion as a left substring and each right portion as a right substring;
(t) processing the set of left substrings in the same manner as a set of label strings corresponding to the multiple utterances including the further step of inhibiting further splitting of a substring when the single model baseform thereof has a higher probability of producing the substring than does the best two-model baseform;
(u) processing the set of right substrings in the same manner as the set of label strings corresponding to the multiple utterances, including the further step of inhibiting further splitting of a substring when the single model baseform thereof has a higher probability of producing the substring than does the best two-model baseform; and
(v) concatenating the unsplit single models in an order corresponding to the order of the label substrings to which they correspond.

12. The method of claim 11 wherein step (l) includes the further steps of:
(w) aligning a concatenated baseform against each of the label strings and identifying, for each model in the concatenated baseform, the substring in each label string which corresponds thereto, the substrings corresponding to a given model being a set of common substrings;
(x) for each set of common substrings, determining the model having the highest joint probability of producing the common substrings; and
(y) for each common substring, replacing the model therefor in the concatenated baseform by the determined model of highest joint probability;
the baseform resulting from the replacing of models being a refined baseform.

13. The method of claim 12 wherein step (l) further includes the step of:

(z) repeating steps (w) through (y) until no models are replaced.

14. A speech processing apparatus comprising:
means for measuring the value of at least one feature of a speech input, said speech input occurring over a series of successive time intervals, said means measuring the feature value of the speech input during each time interval to produce a series of feature vector signals representing the feature values;
means for storing a plurality of label vector signals, each label vector signal having at least one parameter value and having a unique identification value;
means for storing a baseform of a first word, said baseform comprising a sequence of baseform segments, each baseform segment being assigned a label vector signal identification value, at least two separate baseform segments being assigned a first label vector signal identification value of a first label vector signal;
means for sorting a series of feature vector signals produced by the measuring means as a result of one or more utterances of the first word into groups of one or more feature vector signals, one group of feature vector signals corresponding to the two or more segments of the baseform of the first word which are assigned the first label vector signal identification value; and
means for modifying the stored parameter value of the first label vector signal as a function solely of the feature values of the feature vectors which correspond to the baseform segments which are assigned the identification value of the first label vector signal.

15. A speech processing apparatus as claimed in claim 14, characterized in that each baseform segment is assigned a Markov model.

16. A speech processing apparatus as claimed in claim 15, characterized in that the means for modifying the stored parameter value of the first label vector signal calculates the arithmetic mean and covariance of the feature values of the feature vectors which correspond to the baseform segments which are assigned the identification value of the first label vector signal.

17. A speech processing apparatus as claimed in claim 14, characterized in that the sorting means comprises:
means for comparing the feature value, of each feature vector signal in the series of feature vector signals produced by the measuring means as a result of the utterance of the first word, to the parameter of the label vector signals to determine, for each feature vector, the closest associated label vector signal to produce a series of closest label vector signals; and
means for determining, for each label vector signal in the series of closest label vector signals, the baseform segment of the uttered word which most likely generated the feature value associated with the label vector signal.

18. A speech processing apparatus comprising:
means for measuring the value of at least one feature of a speech input, said speech input occurring over a series of successive time intervals, said means measuring the feature value of the speech input during each time interval to produce a series of feature vector signals representing the feature values;

means for storing a plurality of label vector signals, each label vector signal having at least one parameter value and having a unique identification value;

means for storing baseforms of first and second words, each baseform comprising a sequence of baseform segments, each baseform segment being assigned a label vector signal identification value, at least one baseform segment from the baseform of the first word being assigned a first label vector signal identification value of a first label vector signal, at least one baseform segment from the baseform of the second word being assigned the first label vector signal identification value;

means for sorting a series of feature vector signals produced by the measuring means as a result of one or more utterances of the first and second words into groups of one or more feature vector signals, one group of feature vector signals corresponding to the two or more segments of the baseforms of the first and second words which are assigned the first label vector signal identification value; and means for modifying the stored parameter value of the first label vector signal as a function solely of the feature values of the feature vectors which correspond to the baseform segments which are assigned the identification value of the first label vector signal.

19. A speech processing apparatus as claimed in claim 18, characterized in that each baseform segment is assigned a Markov model.

20. A speech processing apparatus as claimed in claim 19, characterized in that the means for modifying the stored parameter value of the first label vector signal calculates the arithmetic mean and covariance of the feature values of the feature vectors which correspond to the baseform segments which are assigned the identification value of the first label vector signal.

21. A speech processing apparatus as claimed in claim 18, characterized in that the sorting means comprises:

means for comparing the feature value, of each feature vector signal in the series of feature vector signals produced by the measuring means as a result of the utterance of the first and second words, to the parameter values of the label vector signals to determine, for each feature vector, the closest associated label vector signal to produce a series of closest label vector signals; and means for determining, for each label vector signal in the series of closest label vector signals, the baseform segment of the uttered words which most likely generated the feature value associated with the label vector signal.

* * * * *